United States Patent
Vorp et al.

(10) Patent No.: US 11,966,887 B1
(45) Date of Patent: Apr. 23, 2024

(54) BRIDGING NETWORK TRANSACTION PLATFORMS TO UNIFY CROSS-PLATFORM TRANSFERS

(71) Applicant: Chime Financial, Inc., San Francisco, CA (US)

(72) Inventors: Richard Vorp, Walnut Creek, CA (US); Geetha Premraj, Livermore, CA (US); Michael Ducker, San Francisco, CA (US); Priyanka Seth, San Jose, CA (US); Praveen Jain, San Mateo, CA (US); Fletcher Fowler, Portsmouth, NH (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

(21) Appl. No.: 18/050,252

(22) Filed: Oct. 27, 2022

(51) Int. Cl.
  *G06Q 40/00* (2023.01)
  *G06Q 20/02* (2012.01)
  *G06Q 20/10* (2012.01)

(52) U.S. Cl.
  CPC ......... *G06Q 20/027* (2013.01); *G06Q 20/108* (2013.01)

(58) Field of Classification Search
  CPC .......................... G06Q 20/027; G06Q 20/108
  See application file for complete search history.

(56) References Cited

U.S. PATENT DOCUMENTS

2008/0046349 A1* 2/2008 Elberg ................... G06Q 40/02
  705/35
2012/0158589 A1* 6/2012 Katzin .................. G06Q 20/22
  705/44
2014/0297784 A1* 10/2014 Zhao ..................... H04L 67/306
  709/217

(Continued)

FOREIGN PATENT DOCUMENTS

| CN | 114255021 | * | 3/2022 | ........... G06Q 20/065 |
| WO | WO-0178855 A2 | * | 10/2001 | ............. G06Q 50/34 |
| WO | WO-2013166507 A1 | * | 11/2013 | ............. G06Q 20/02 |

OTHER PUBLICATIONS

Qui et al., "A Cross-platform Mobile Payment Solution Based on Web Technology," 978-1-4577-1964-6/12, IEEE, 2012 (Year: 2012).*

(Continued)

*Primary Examiner* — Abhishek Vyas
*Assistant Examiner* — William B. Bunker
(74) *Attorney, Agent, or Firm* — Keller Preece PLLC

(57) ABSTRACT

The disclosure describes embodiments of systems, methods, and non-transitory computer readable storage media that enable network transactions between user accounts belonging to different network transaction platforms and unify user account modifications across user accounts on different network transaction platforms. For instance, the disclosed systems can cause two or more network transaction platforms to transmit and/or receive transactional values from one or more intermediary holding accounts upon receiving network transaction requests between user accounts belonging to the two or more network transaction platforms. In addition, the disclosed system can unify user account data on different network transaction platforms by modifying or updating the user account data (e.g., user attributes) by propagating schematized data messages to the one or more other network transaction platforms with instructions to modify or update the user attributes on other user accounts related to the user account.

20 Claims, 8 Drawing Sheets

(56) References Cited

U.S. PATENT DOCUMENTS

| | | | | |
|---|---|---|---|---|
| 2017/0068939 | A1* | 3/2017 | Groarke | G06Q 20/20 |
| 2017/0249642 | A1* | 8/2017 | Burpulis | G06Q 30/018 |
| 2018/0013746 | A1* | 1/2018 | Kumar | G06Q 40/02 |
| 2018/0315051 | A1* | 11/2018 | Hurley | G06Q 20/3255 |
| 2019/0172087 | A1* | 6/2019 | Chokshi | G06Q 30/0227 |
| 2020/0051163 | A1* | 2/2020 | Bhat | G06F 9/451 |
| 2022/0101309 | A1* | 3/2022 | Eirinberg | G06Q 20/389 |

OTHER PUBLICATIONS

Huang et al., "A Method of Cross-Platform Network Data Exchange," Fujian Key Lab of Microelectronics and Integrated Circuits, Fuzhou University, Fuzhou, China, IEEE publication, 2016 (Year: 2016).*

Huang et al., "Faceless: A Cross-Platform Private Payment Scheme for Human-Readable Identifiers," 19th Annual International Conference on Privacy Security and Trust, 2022 (Year: 2022).*

Anonymous, "Account Aggregation," https://www.unnax.com/category/account-aggregation/; 2018 (Year: 2018).*

Anonymous, Using JSON to Exchange Data, https://betterexplained.com/articles, 2015 (Year: 2015).*

Nanda, "JSON, Part 2: Generate JSON documents from Oracle Database with SQL," https://www.oracle.com/news/connect, 2015 (Year: 2015).*

Xiao et al., "Design and Research of M2M Message Transfer Mechanism of Looms for Information Transmission," IEEE Access, vol. 10, 2022 (Year: 2022).*

Galileo.com; "We're a proven financial technology platform, an innovation engine and a leader in card issuing, payments and digital banking"; Date downloaded Nov. 8, 2022; https://www.galileo-ft.com.

* cited by examiner

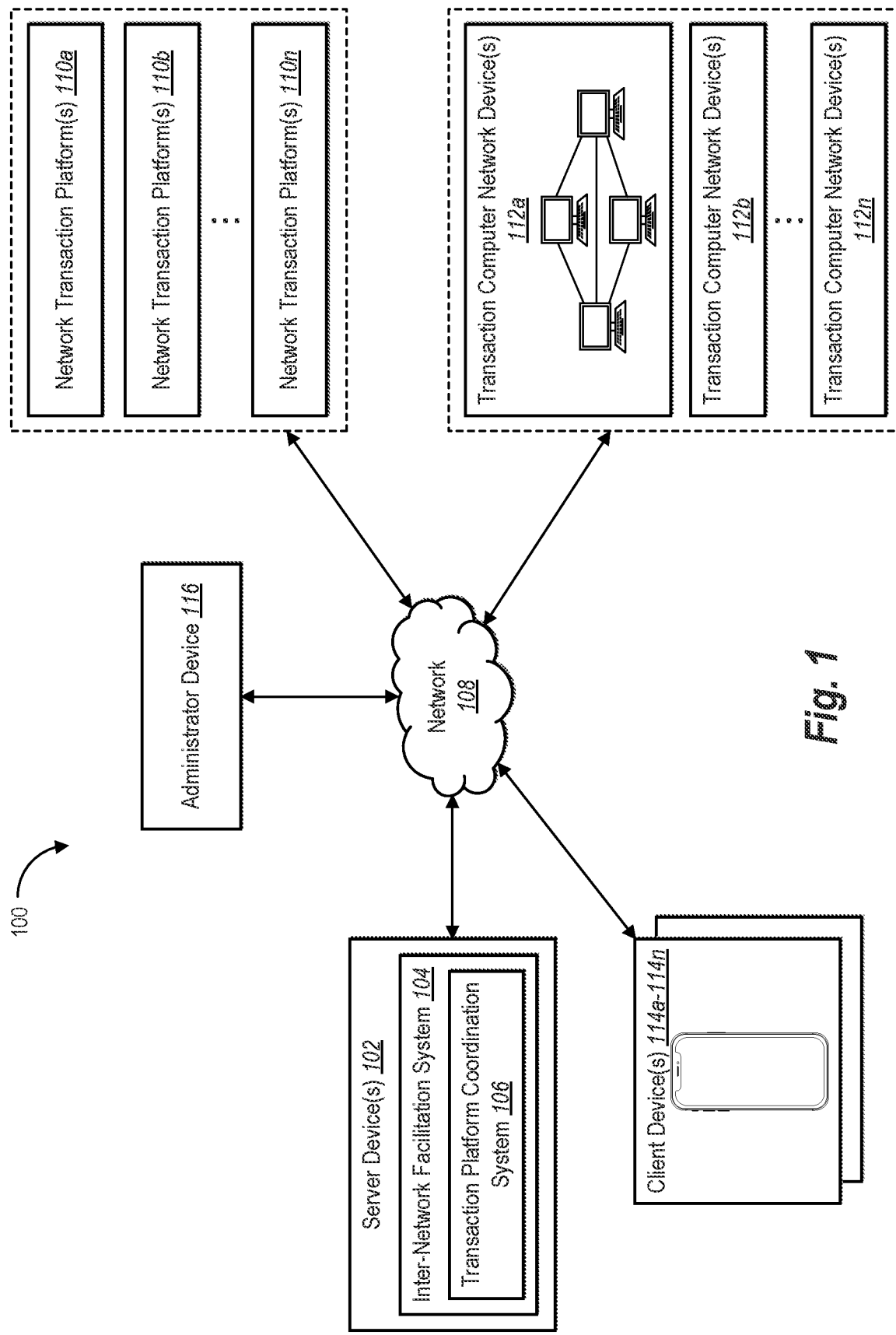

BRIDGING NETWORK TRANSACTION PLATFORMS TO UNIFY CROSS-PLATFORM TRANSFERS

BACKGROUND

Recent years have seen a significant development in systems that utilize web-based and mobile-based applications to manage user accounts and digital information for user accounts in real time. For instance, many conventional applications provide, to client devices, various graphical user interfaces (GUIs) to present digital information and options to modify information or perform network transactions between network-based services. Oftentimes, modifying information or performing network transactions includes modifying user account information and performing network transactions between web-based and/or mobile-based applications to transfer or move assets between different user accounts or different transaction platforms. Although many conventional systems attempt to communicate and host such user account activities and network transactions on web-based and mobile-based applications, such conventional systems often face a number of technical shortcomings. Indeed, many conventional systems attempt to unify user activity data between user accounts or perform network transactions between user accounts across different network transaction platforms in a rigid and inefficient manner.

For example, many conventional systems cannot easily communicate changes and/or unify user activity data of multiple related user accounts when the user accounts utilize different network clusters or network platforms (e.g., different types of data schemas, source code, network protocols). This rigidness in communicating changes and/or unifying user activities across different network clusters or platforms often results in conventional systems being limited to user account interactions with user accounts that operate within the same network cluster or network platform. In addition, many conventional systems often fail to easily enable cross-platform user account network transactions. Indeed, due to communication limitations stemming from different structures between multiple network platforms, conventional systems often cannot flexibly enable user accounts operating on different network platforms to complete network transactions.

Indeed, many of these conventional systems require dedicated interfacing between each combination of transaction network platforms (e.g., a dedicated and custom application interface program (API)) to effectively communicate user account activity and to enable network transactions across the transaction network platforms. However, such APIs become clumsy and difficult to implement because each pairing of transaction network platforms require a specialized API and each API requires updates whenever a transaction network platform from the pair receive updates in functionalities. Furthermore, many conventional systems cannot easily and readily integrate existing transaction network platforms with new transaction network platforms until dedicated APIs are created for communication with the new transaction network platforms. Moreover, the lack of easy and simple communication integration between transaction network platforms prevents transaction source networks (e.g., banking networks, credit networks) from having a unified view of users and user transaction data across multiple user accounts on multiple, disjointed transaction network platforms.

In addition to being inflexible, conventional systems often provide inefficient approaches to enable network transactions and/or user data unification between different transaction network platforms. For instance, in many cases, conventional systems provide a web browser-based service tool that enables individual services (or actors) to query other sources (e.g., other transaction network platforms) to update or view user activity data and/or user transaction activity. However, such conventional systems experience a substantial number of queries that cause a great amount of network traffic and utilization of computational resources. Furthermore, the use of queries often results in inefficient errors across transaction network platforms because user activity data and/or user transaction activity is often updated or overwritten in middle of an active query call.

Additionally, many conventional systems perform network transactions between different user accounts on different transaction network platforms by submitting message-based requests to process a transaction and/or mail-based requests. However, such conventional systems utilize an inefficient amount of time to complete a network transaction across different user accounts on different transaction network platforms. For instance, due to the request process, such conventional systems often require a noticeable amount of time between a network transaction request and completion of the network transaction request (e.g., 24 hours, multiple days).

SUMMARY

The disclosure describes one or more embodiments of systems, methods, and non-transitory computer readable media that enable quick network transactions between user accounts belonging to different network transaction platforms. For example, the disclosed systems can receive network transaction requests from user accounts that correspond to different network transaction platforms. Upon receiving the network transaction request from a sending user account on a network transaction platform to initiate a transfer of a transactional value to a receiving user account on another network transaction platform, the disclosed systems can transmit instructions to the network transaction platforms to transfer and receive the transactional value for the network transaction from an intermediary holding account. In addition, the disclosed systems can cause the sending user account and the receiving user account to update user account values associated with the user accounts after receiving the network transaction request. In addition to enabling the network transaction, the disclosed systems can receive data indicators from the intermediary holding account that establish successful and/or unsuccessful transfers between the multiple network transaction platforms.

In addition, the disclosed systems can unify user account modifications across user accounts on different network transaction platforms. In one or more embodiments, the disclosed systems can receive a user account attribute modification from a user account belonging to a network transaction platform. The disclosed systems can identify other user accounts associated with the user account (on one or more other network transaction platforms) to modify the user attributes on those other user accounts. Indeed, the disclosed systems modify or update the user account data by causing the network transaction platform to send (e.g., propagate) a schematized data message (from a data update messenger) to the one or more other network transaction platforms with instructions to modify or update the user attributes on the other related user accounts.

BRIEF DESCRIPTION OF THE DRAWINGS

The detailed description is described with reference to the accompanying drawings in which:

FIG. 1 illustrates a schematic diagram of an environment for implementing an inter-network facilitation system and a transaction platform coordination system in accordance with one or more implementations.

DETAILED DESCRIPTION

Figure 2A:
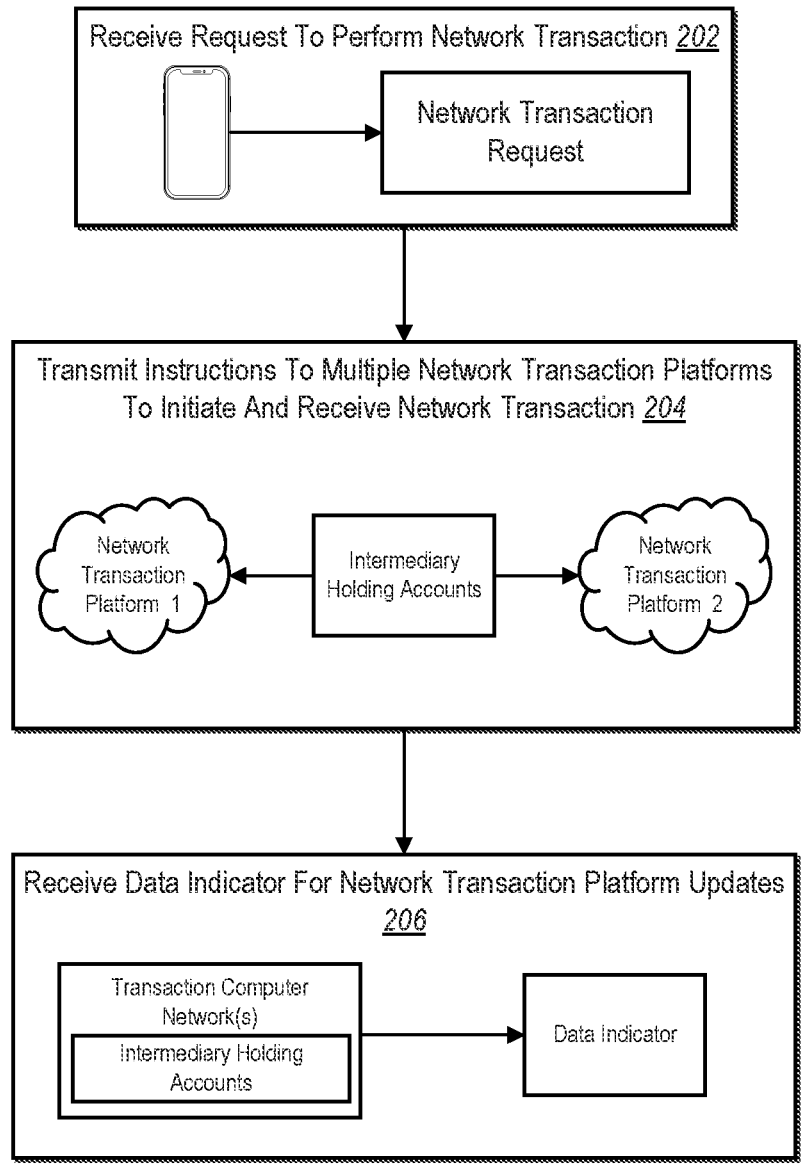
FIG. 2A illustrates an overview of a transaction platform coordination system enabling a network transaction between user accounts on different network transaction platforms in accordance with one or more implementations.

The disclosure describes one or more embodiments of a transaction platform coordination system that enables quick network transactions between user accounts on different network transaction platforms and also unifies user account modifications across the different network transaction platforms. In particular, the transaction platform coordination system can cause two or more network transaction platforms to transmit and/or receive transactional values from one or more intermediary holding accounts upon receiving network transaction requests between user accounts belonging to the two or more network transaction platforms. Indeed, by utilizing the one or more intermediary holding accounts, the transaction platform coordination system can enable these user accounts belonging to disjointed (or different) network transaction platforms to transfer and/or receive transactional values in real- (or near-real-) time. Additionally, the transaction platform coordination system can also unify user account data on different network transaction platforms by modifying or updating the user account data (e.g., user attributes) by propagating schematized data messages the one or more other network transaction platforms with instructions to modify or update the user attributes on other user accounts related to the user account.

In one or more embodiments, the transaction platform coordination system receives a request, from a user account, to perform a network transaction between user accounts that belong to different network transaction platforms (e.g., a first and a second network transaction platform). Subsequently, the transaction platform coordination system can provide instructions to the first network transaction platform belonging to the user account to initiate a transfer of a transactional value (corresponding to the network transaction) to at least one intermediary holding account. Additionally, the transaction platform coordination system can provide instructions to the second network transaction platforming belonging to another user account to receive the transactional value from the same at least one intermediary holding account. Indeed, the transaction platform coordination system also causes the user accounts to update user account values based on the network transaction request. Moreover, in some implementations, the transaction platform coordination system also receives data indicators indicating a transfer of the transaction value between the user accounts (from the first and second network transaction platforms) through the intermediary holding account.

As also mentioned above, in some cases, the transaction platform coordination system unifies user account modifications across the different network transaction platforms. In particular, in one or more embodiments, the transaction platform coordination system receives a user activity from a first user account belonging to a first network transaction platform. For example, the user activity can include a request to modify a user attribute corresponding to the first user account. In addition to causing the modification of the user attribute at the first user account, the transaction platform coordination system can identify one or more other user accounts on one or more other network transaction platforms that are associated with (or related to) the first user account. Moreover, the transaction platform coordination system can transmit instructions to the one or more network transaction platforms, that include related user accounts to the first user account, to cause the one or more network transaction platforms to modify the user attribute on the one or more other user accounts.

The transaction platform coordination system can provide numerous technical advantages, benefits, and practical applications relative to conventional systems. To illustrate, unlike conventional systems that are limited to user account interactions with user accounts that belong to the same network platform, the transaction platform coordination system can easily unify user activity data of multiple related user accounts even when the user accounts utilize different network platforms. In one or more implementations, the transaction platform coordination system transmits schematized data messages to multiple network platforms with instructions to modify or update user attributes across one or more related user accounts such that, unlike conventional systems, a dedicated interface (or API) is not required between pairings of network platforms. In addition, due to the utilization of a flexible schematized data message, the transaction platform coordination system can easily cause a new transaction network platform to integrate with other transaction network platforms by adopting user attribute modifications for related accounts without having to create specific protocols between each pairing of the transaction network platforms.

Furthermore, the transaction platform coordination system can easily enable cross-platform user account network transactions. For instance, in contrast to many conventional systems that rigidly require user accounts to operate on the same transaction network platform to complete a transaction request between the user accounts, the transaction platform coordination system can utilize intermediary holding accounts to facilitate transactions between user accounts on different transaction network platforms. In some cases, the transaction platform coordination system can utilize intermediary holding accounts to establish network transactions between various combinations of transaction network platforms (even when the network transaction platforms are otherwise not connected) while making a front-end user account transaction between the user accounts seamless and fast. Additionally, the transaction platform coordination system also does not require specific APIs between transaction network platforms to communicate and/or complete network transactions that are cross platform.

In addition to improved flexibility, the transaction platform coordination system can also enable a client device to initiate network transactions (or other account activities) between different accounts and/or transaction computer networks with less communication and navigational steps. By utilizing a system capable of coordination between several transaction network platforms, the transaction platform coordination system reduces the number of digital cross-platform communications required by conventional systems. For example, unlike many conventional systems that utilize frequent querying to update account data (and/or utilize messages to complete network transactions) across multiple network platforms, the transaction platform coordination system unifies the various transaction network platforms using a schematized message that synchronizes account data across the transaction network platforms. In addition, the transaction platform coordination system can also, via various intermediary holding accounts, facilitate quick network transactions across disparate transaction network platforms without having the transaction network platforms executing queries or communications with each other to complete the network transaction.

As mentioned above, conventional systems often execute separate software applications with different and disconnected user interfaces for different transaction network platforms-forcing user devices to navigate across (e.g., navigate back-and-forth between) different graphical user interfaces of different transaction network platforms. In contrast, in one or more implementations, the transaction platform coordination system utilizes schematized data messages and/or intermediary holding accounts to enable functional coordination between disconnected (or different) transaction network platforms without utilizing excessive user interaction to achieve a functionality (e.g., changing account attributes or performing a cross-platform network transaction). For instance, the transaction platform coordination system can facilitate user activity that changes a user account to be propagated to other related user accounts on different transaction network platforms without requiring navigation across software applications and/or between isolated graphical user interfaces. Accordingly, the transaction platform coordination system reduces or eliminates both excessive computer processing and excessive computing device interaction experienced by conventional systems to change account attributes on multiple accounts or perform a cross-platform network transaction.

As indicated by the foregoing discussion, the present disclosure utilizes a variety of terms to describe features and advantages of the transaction platform coordination system. As used herein, the term "network transaction" refers to an electronic communication causing a transfer (or exchange) of a transactional value between two or more user accounts on two or more transaction facilitators (e.g., via transaction computer networks). In some cases, a network transaction includes, but is not limited to, a transfer of a transactional value (e.g., a monetary or currency value, a credit value, a stock property) between user accounts.

For example, a network transaction can include a peer-to-peer network transaction request in which a user account initiates a transfer or retrieval of a transactional value from another user account (e.g., via a digital wallet and/or user account address). In some cases, the network transaction can include an inter-bank network transaction request in which a user account corresponding to a first transaction source (e.g., using a first network transaction platform) initiates a transfer or retrieval of a transactional value from another user account corresponding to a second transaction source (e.g., using a first and/or a second network transaction platform). Additionally, the network transaction can include an intra-bank network transaction request in which a user account corresponding to a first transaction source (e.g., using a first network transaction platform) initiates a transfer or retrieval of a transactional value from another user account corresponding to the same transaction source (e.g., using a first and/or a second network transaction platform).

In certain implementations, a network transaction can include a user interaction that causes an information exchange between two or more user accounts for various functionalities between the user accounts (or an inter-network facilitation system). For example, the network transaction can include identity verification exchanges (i.e., know your client verification (KYC)), such as, but not limited to, identity card verification, face verification, biometric verification, password verification, electronic document verification. In some cases, the network transaction can include risk assessment exchanges between one or more network transaction platforms, such as, but not limited to risk scores, credit scores, and/or user account history.

As further used herein, the term "transaction computer network device(s)" (sometimes referred to as a "transactional source computer network") refers to a system (e.g., one or more computing devices) that process, receive, or otherwise facilitate network transactions or network transaction requests. In one or more embodiments, a transaction computer network device(s) corresponds to a transaction facilitator that is an entity or an operator of a computer network that hosts user accounts for monetary services, such as requests to exchange currency, transfer currency, deposit currency, or withdraw currency. For instance, the transaction computer network device(s) corresponds to a transaction facilitator that can include, but is not limited to, a financial institution or an e-commerce website.

As used herein, the term "transaction network platform" refers to a computer network platform that integrates with transaction computer network device(s) to enable user interactions and/or network transactions on the transaction computer network device(s) (or the user accounts hosted on the transaction computer network device(s)). In some cases, a transaction network platform can include a system of record processor comprising a collection of computer devices, data schemas, source code, and/or network protocols that enable the transaction computer network device(s) to facilitate the user interactions and/or network transactions. In one or more implementations, a transaction network platform includes data schemas, source code, and/or network communication protocols (e.g., APIs) that enable transaction computer network device(s) to facilitate a user account to perform actions, such as, but not limited to, managing or modifying user account data, electronically exchanging currency or other transactional values, electronically transferring currency or other transactional values, electronically depositing currency or other transactional values, and/or electronically withdrawing currency or other transactional values.

As used herein, the term "intermediary holding account" refers to a user account within a transaction computer network device(s) utilized to allocate transactional values for transactions between user accounts on a transaction facilitator utilizing a transaction network platform and other user accounts on another (or the same) transaction facilitator utilizing another transaction network platform. In some cases, the intermediary holding account allocates a transactional value or an aggregate of transactional values (e.g., via transmitting of and/or receiving of transactional values) between one or more user accounts corresponding to a transaction network platform and one or more other user accounts corresponding to another transaction network platform.

Furthermore, as used herein, the term "user attribute" refers to information (or data) associated with a user account. For example, the term "user attribute" can refer to information, such as, but not limited to, activity data, user contact information, account values for a user account. For example, a user attribute of a user account can include a user address, a user phone number, and/or a user email address. Furthermore, a user attribute of a user account can also include user activity data, such as, but not limited to, transaction activity within a user account, flagged activities, declined transactions corresponding to the user account, and/or user login activity.

Turning now to the figures, FIG. 1 illustrates a block diagram of a system 100 (or system environment) for implementing an inter-network facilitation system 104 and a transaction platform coordination system 106 in accordance with one or more embodiments. As shown in FIG. 1, the system 100 includes server device(s) 102 (which includes the inter-network facilitation system 104 and the transaction platform coordination system 106), network transaction platform(s) 110a-110n, transaction computer network device(s) 112a-112n, client device(s) 114a-114n, and an administrator device 116. As further illustrated in FIG. 1, the server device(s) 102, the network transaction platform(s) 110a-110n, the transaction computer network device(s) 112a-112n, the client device(s) 114a-114n, and the administrator device 116 can communicate via the network 108.

Although FIG. 1 illustrates the transaction platform coordination system 106 being implemented by a particular component and/or device within the system 100, the transaction platform coordination system 106 can be implemented, in whole or in part, by other computing devices and/or components in the system 100 (e.g., the client device(s) 114a-114n). Additional description regarding the illustrated computing devices (e.g., the server device(s) 102, computing devices implementing the transaction platform coordination system 106, the network transaction platform(s) 110a-110n, the transaction computer network device(s) 112a-112n, the client device(s) 114a-114n, the administrator device 116, and/or the network 108) is provided with respect to FIGS. 6 and 7 below.

In some embodiments, the inter-network facilitation system 104 can determine, store, generate, and/or display financial information corresponding to a user account (e.g., a banking application, a money transfer application). Furthermore, the inter-network facilitation system 104 can also electronically communicate (or facilitate) financial transactions between one or more user accounts (and/or computing devices). Moreover, the inter-network facilitation system 104 can also track and/or monitor financial transactions and/or financial transaction behaviors of a user within a user account.

The inter-network facilitation system 104 can include a system that comprises the transaction platform coordination system 106 and that facilitates financial transactions and digital communications across different computing systems over one or more networks. For example, an inter-network facilitation system manages credit accounts, secured accounts, and other accounts for one or more accounts registered within the inter-network facilitation system 104. In some cases, the inter-network facilitation system 104 is a centralized network system that facilitates access to online banking accounts, credit accounts, and other accounts within a central network location. Indeed, the inter-network facilitation system 104 can link accounts from different network-based financial institutions to provide information regarding, and management tools for, the different accounts (e.g., using the same or different network transaction platforms).

In one or more embodiments, the transaction platform coordination system 106 unifies user account modifications across the different network transaction platforms. For example, the transaction platform coordination system 106 can receive a user account attribute modification from a client device (from the client device(s) 114a-114n) for a user account and modify the user account attribute. The transaction platform coordination system 106 can identify one or more other user accounts that are associated to the user account from within the transaction computer network device(s) 112a-112n (which can operate using one or more of the network transaction platform(s) 110a-110n). Furthermore, the transaction platform coordination system 106 can send (e.g., propagate) schematized data messages to the one or more other network transaction platforms (from the network transaction platform(s) 110a-110n) with instructions to modify or update user attributes on the other user accounts related to the user account (e.g., to unify the user accounts).

Additionally, the transaction platform coordination system 106 can also enable network transactions between user accounts on different network transaction platforms. For instance, the transaction platform coordination system 106 can receive a request to perform a network transaction with another user account. Indeed, the transaction platform coordination system 106 can determine that the user account and the other user account belong to separate network transaction platforms (from the network transaction platform(s) 110a-110n). In response, the transaction platform coordination system 106 can cause the network transaction platforms (from the network transaction platform(s) 110a-110n) to transmit and/or receive transactional values from one or more intermediary holding accounts (within the transaction computer network device(s) 112a-112n). By utilizing the one or more intermediary holding accounts, the transaction platform coordination system 106 can enable these user accounts belonging to different network transaction platforms to transfer and/or receive transactional values while handling the actual transmission of transactional funds separately using the intermediary holding accounts between the separate network transaction platforms (from the network transaction platform(s) 110a-110n).

As further shown in FIG. 1, the system 100 includes the transaction computer network device(s) 112a-112n. In one or more embodiments, the transaction computer network device(s) 112a-112n correspond to one or more transaction facilitators that utilize a network of computer devices to host user accounts for monetary services (e.g., exchange currency, transfer currency, deposit and/or withdraw money), e-commerce services, and/or investment services. In some cases, the transaction computer network device(s) 112a-112n include computer devices operated by transaction facilitators (e.g., a financial institution, e-commerce website) to enable functionalities and services provided by the transaction facilitators. Indeed, various transaction facilitators can operate and/or include various transaction computer network devices (e.g., separately).

Additionally, as shown in FIG. 1, the system 100 includes network transaction platform(s) 110a-110n. For example, a transaction facilitator (via the transaction computer network device(s) 112a-112n) communicates with (or utilizes) a network transaction platform to facilitate the functionalities and/or services provided by the transaction facilitator. For instance, the network transaction platform(s) 110a-110n can include data schemas, source code, and/or network communication protocols (e.g., APIs) that enable transaction computer network device(s) to facilitate a user account to perform actions, such as, but not limited to, managing or modifying user account data, electronically exchanging currency or other transactional values, electronically transferring currency or other transactional values, electronically depositing currency or other transactional values, and/or electronically withdrawing currency or other transactional values. In some cases, the transaction computer network device(s) 112a-112n (or the inter-network facilitation system 104) implements (or hosts) a network transaction platform internally.

As also illustrated in FIG. 1, the system 100 includes the client device(s) 114a-114n. For example, the client device(s) 114a-114n may include, but are not limited to, mobile devices (e.g., smartphones, tablets) or other type of computing devices, including those explained below with reference to FIGS. 6 and 7. Additionally, the client device(s) 114a-114n can include computing devices associated with (and/or operated by) user accounts for the inter-network facilitation system 104. Moreover, the system 100 can include various numbers of client devices that communicate and/or interact with the inter-network facilitation system 104 and/or the transaction platform coordination system 106.

Furthermore, the client device(s) 114a-114n can include the client application(s). The client application(s) can include instructions that (upon execution) cause the client device(s) 114a-114n to perform various actions. For example, a user of a user account can interact with the client application(s) on the client device(s) 114a-114n to access financial information, initiate a financial transaction (e.g., transfer money to another account, deposit money, withdraw money), and/or modify user attributes corresponding to the user account.

In certain instances, the client device(s) 114a-114n corresponds to one or more user accounts (e.g., user accounts stored at the server device(s) 102 and/or at the transaction computer network device(s) 112a-112n). For instance, a user of a client device can establish a user account with login credentials and various information corresponding to the user. In addition, the user accounts can include a variety of information regarding financial information and/or financial transaction information for users (e.g., name, telephone number, address, bank account number, credit amount, debt amount, financial asset amount), payment information (e.g., account numbers), transaction history information, and/or contacts for financial transactions. In some embodiments, a user account can be accessed via multiple devices (e.g., multiple client devices) when authorized and authenticated to access the user account within the multiple devices. In addition, a user account can belong to a specific network transaction platform (e.g., the network transaction platform(s) 110a-110n) such that modifications or interactions of the user account are handled by the specific network transaction platform.

In one or more embodiments, the inter-network facilitation system 104 interacts with transaction computer network device(s) 112a-112n and network transaction platform(s) 110a-110n to provide a front-end user experience to for a user account. In particular, the inter-network facilitation system 104 provides (or displays) one or more graphical user interfaces on the client device(s) 114a-114n to enable various functions and/or services (as described above) for a user account (via the client application(s)). Indeed, the inter-network facilitation system 104 can enable the functions and/or services for the user account by communication or providing instructions to the transaction computer network device(s) 112a-112n and network transaction platform(s) 110a-110n for front-end user interactions belonging to user accounts within one or more front-end user interfaces on the client device(s) 114a-114n.

The present disclosure utilizes client devices to refer to devices associated with user accounts (as described above). In referring to a client (or user) device, the disclosure and the claims are not limited to communications with a specific device, but any device corresponding to a user account of a particular user. Accordingly, in using the term client device, this disclosure can refer to any computing device corresponding to a user account of an inter-network facilitation system (and/or one or more transaction computer network device(s) or network transaction platform(s)).

Additionally, as shown in FIG. 1, the system 100 also includes the administrator device 116. In certain instances, the administrator device 116 may include, but is not limited to, a mobile device (e.g., smartphone, tablet) or other type of computing device, including those explained below with reference to FIGS. 6 and 7. Additionally, the administrator can include a computing device associated with (and/or operated by) an administrator for the inter-network facilitation system 104. Moreover, the system 100 can include various numbers of administrator devices that communicate and/or interact with the inter-network facilitation system 104 and/or the transaction platform coordination system 106. Indeed, the administrator device 116 can also request a user account attribute modification (for one or more user accounts), receive a propagated schematized data message with instructions to modify or update user attributes, and/or request a network transaction between user accounts (as described herein). Moreover, the administrator device 116 can provide one or more setting modifications and/or configurations for the transaction platform coordination system 106.

As further shown in FIG. 1, the system 100 includes the network 108. As mentioned above, the network 108 can enable communication between components of the system 100. In one or more embodiments, the network 108 may include a suitable network and may communicate using a various number of communication platforms and technologies suitable for transmitting data and/or communication signals, examples of which are described with reference to FIGS. 6 and 7. Furthermore, although FIG. 1 illustrates the server device(s) 102, the transaction computer network device(s) 112a-112n, the network transaction platform(s) 110a-110n, the client device(s) 114a-114n, and the administrator device 116 communicating via the network 108, the various components of the system 100 can communicate and/or interact via other methods (e.g., the server device(s) 102 and the transaction computer network device(s) 112a-112n can communicate directly).

As mentioned above, the transaction platform coordination system 106 can enable network transactions between user accounts on different network transaction platforms. For example, FIG. 2A illustrates an overview of the transaction platform coordination system 106 utilizing intermediary accounts to enable network transactions between user accounts on different network transaction platforms. As shown in FIG. 2A, the transaction platform coordination system 106 receives a request to perform a network transaction, provides instructions to multiple network transaction platforms to initiate transfers with an intermediary account, and also receives a data indicator from a transaction computer network of the intermediary account to indicate the network transaction between the two network transaction platforms.

As shown in act 202 of FIG. 2A, the transaction platform coordination system 106 receives a request to perform a network transaction from a client device. In particular, the transaction platform coordination system 106 can receive a request to perform a network transaction between the user account corresponding to the client device and another user account. Indeed, the transaction platform coordination system 106 can enable the requested network transaction to be between various user accounts hosted on various transaction computer network(s) that utilize varying network transaction platforms as described below (e.g., in relation to FIG. 3).

Upon receiving the request to perform the network transaction, as shown in act 204 of FIG. 2, the transaction platform coordination system 106 transmits instructions to multiple network transaction platforms to initiate and receive the network transaction. Indeed, as shown in the act 204 of FIG. 2, the transaction platform coordination system 106 instructs a transaction computer network utilizing a first network transaction platform (corresponding to the sending user account) to transmit a network transaction value to an intermediary holding account associated with second network transaction platform (which corresponds to the other user account). Moreover, as shown in the act 204 of FIG. 2, the transaction platform coordination system 106 can also instruct another (or the same) transaction computer network to utilize the second network platform to receive the network transaction value from the intermediary holding account and associate it with the receiving user account. Utilizing intermediary holding accounts to enable network transactions between user accounts hosted on different network transaction platforms is described in greater detail below (e.g., in relation to FIG. 3).

In addition, as shown in act 206 of FIG. 2, the transaction platform coordination system 106 receives data indicators for network transaction platform updates (e.g., after the instructions to initiate and/or receive a network transaction in the act 204). In particular, the transaction platform coordination system 106 can receive a data indicator from the transaction computer network(s) hosting the intermediary holding account that includes an indication of a successful (or unsuccessful) transfer between the accounts corresponding to the network transaction platforms. In some cases, the transaction platform coordination system 106 receives a data indicator that indicates an account value of the intermediary holding account. In one or more embodiments, the transaction platform coordination system 106 utilizes the account value to determine whether transfers between user accounts across the two or more network transaction platforms were successful.

To illustrate, in some embodiments, the transaction platform coordination system 106 utilizes a data indicator that indicates an account value of the intermediary holding account to determine whether network transactions between accounts corresponding to the first network transaction platform and accounts corresponding to the second network transaction platform balanced. Indeed, in some cases, the transaction platform coordination system 106 determines that transfers between user accounts across the two or more network transaction platforms were successful when the intermediary holding account value is zero. In addition, the transaction platform coordination system 106 can utilize a non-zero intermediary holding account value as a discrepancy between the network transactions of accounts across the two or more network transaction platforms (e.g., one or more network transactions failed or were incorrectly transferred and/or retrieved). Although one or more embodiments utilize an account balance as a data indicator to indicate success of network transactions between two or more network transaction platforms, the transaction platform coordination system 106 can utilize various data indicators, such as, but not limited to, flags from an intermediary holding account and/or logs from an intermediary holding account indicating one or more failed transactions (e.g., a receipt confirmed message and/or a transfer failed message).

Additionally, in some embodiments, the transaction platform coordination system 106 utilizes the indicated failure of a network transaction via the data indicators of the intermediary holding account to identify one or more network transactions between accounts of network transaction platforms that failed. Then, the transaction platform coordination system 106 can utilize the identified one or more failed network transactions to fix (or reconcile) the network transactions. For example, in some cases, the transaction platform coordination system 106 reverses one or more failed network transactions between the network transaction platforms and also reverses the network transaction within the corresponding user accounts. In some cases, the transaction platform coordination system 106 can initiate a transaction retry for the identified failed network transaction by causing the involved network transaction platforms to re-initiate network transactions with a holding account (in accordance with one or more implementations herein).

Figure 2B:
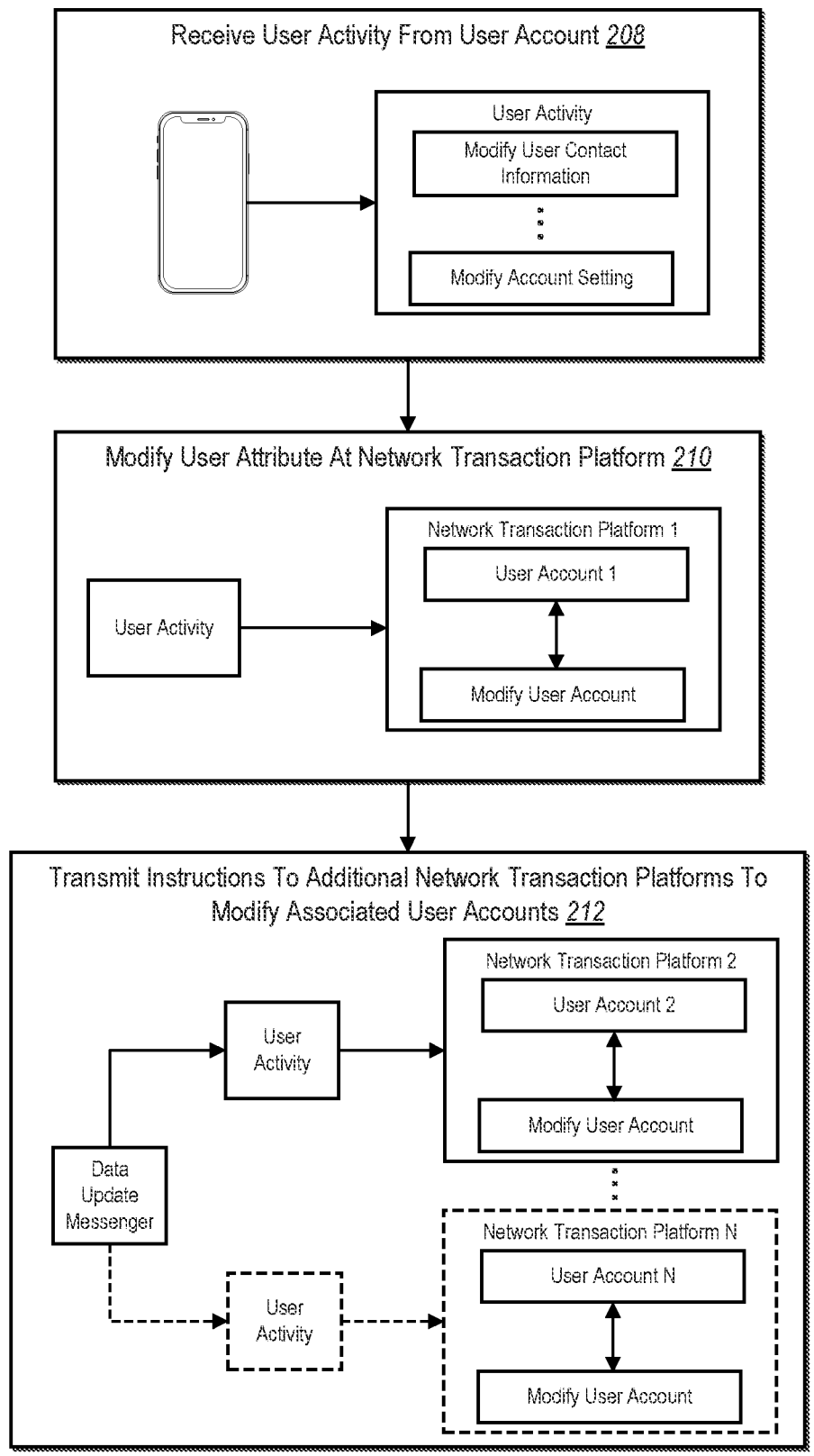
FIG. 2B illustrates an over of a transaction platform coordination system utilizing data update messages to unify user account modifications across multiple user accounts on different network transaction platforms in accordance with one or more implementations.

As previously mentioned, the transaction platform coordination system 106 can also unify user account modifications across the different network transaction platforms. For example, FIG. 2B illustrates an overview of the transaction platform coordination system 106 utilizing data update messages to unify user account modifications across multiple user accounts on different network transaction platforms. As shown in FIG. 2B, the transaction platform coordination system 106 receives a user activity from a user account that indicates a user attribute modification, modifies the user attribute on the user account at a first network transaction platform, and propagates, via a data update message, the modification to related user accounts on different network transaction platforms.

For instance, as shown in act 208 of FIG. 2B, the transaction platform coordination system 106 receives a user activity from a user account. Indeed, as shown in the act 208, the transaction platform coordination system 106 receives a user activity from a client device that indicates a request to modify or update user attributes of a user account. For example, as shown in the act 208, the user activity requesting modification of user attributes can include modifications or updates, such as, but not limited to, modifying user contact information, modifying account settings, and/or updating user transaction activities.

In some cases, the user activity from the client device includes various modifications to one or more user attributes corresponding to a user account. Indeed, the transaction platform coordination system 106 can identify, as a user activity, various modifications to user attributes, such as, but not limited to password changes, contact information changes, and/or account preference changes (e.g., privacy settings, notification settings). In some cases, the transaction platform coordination system 106 can identify user activity, such as requested network transactions, completed network transactions, account value changes, withdrawals, and/or deposits. Moreover, the transaction platform coordination system 106 can also identify user activity, such as user login activity, user customer service communication activity, and/or user service requests (e.g., requesting to enroll in a service or product available via the inter-network facilitation system 104). In some implementations, the transaction platform coordination system 106 can also identify and propagate identity verification or risk assessment user activities from a client device, such as, but not limited to KYC verifications and/or risk scores.

In addition, as shown in act 210 of FIG. 2B, the transaction platform coordination system 106 modifies a user attribute at a network transaction platform (associated with the user account). In particular, as the act 210 of shown in FIG. 2B, the transaction platform coordination system 106 enables a modification to a first user account that belongs to a first network transaction platform. Indeed, in some cases, the transaction platform coordination system 106 receives a request for the user account modification on the first user account in a graphical user interface of the inter-network facilitation system 104, determines that the first user account corresponds to the first network transaction platform, and provides instructions to the first network transaction platform to modify the first user account as described in greater detail below (e.g., in relation to FIG. 4).

Furthermore, as shown in act 212 of FIG. 2B, the transaction platform coordination system 106 transmits instructions to additional network transaction platforms to modify associated user accounts (on the additional network transaction platforms). For instance, as shown in the act 212 of FIG. 2B, the transaction platform coordination system 106 utilizes a data update messenger to transmit data for the user activity (e.g., the user attribute modification) to one or more additional network transaction platforms identified to have a user account associated with the first user account. As shown in the act 212 of FIG. 2B, a second network transaction platform (and a Nth network transaction platform) receive user activity data from the data update messenger (e.g., as a schematized data message) and utilize the data update message regarding the user activity to modify or update a user account (e.g., a second user account and an Nth user account) within different network transaction platforms. Indeed, utilizing schematized data update messages to cause multiple network transaction platforms to modify user attributes based on a user attribute modification at one user account is described in greater detail below (e.g., in relation to FIG. 4).

Figure 3:
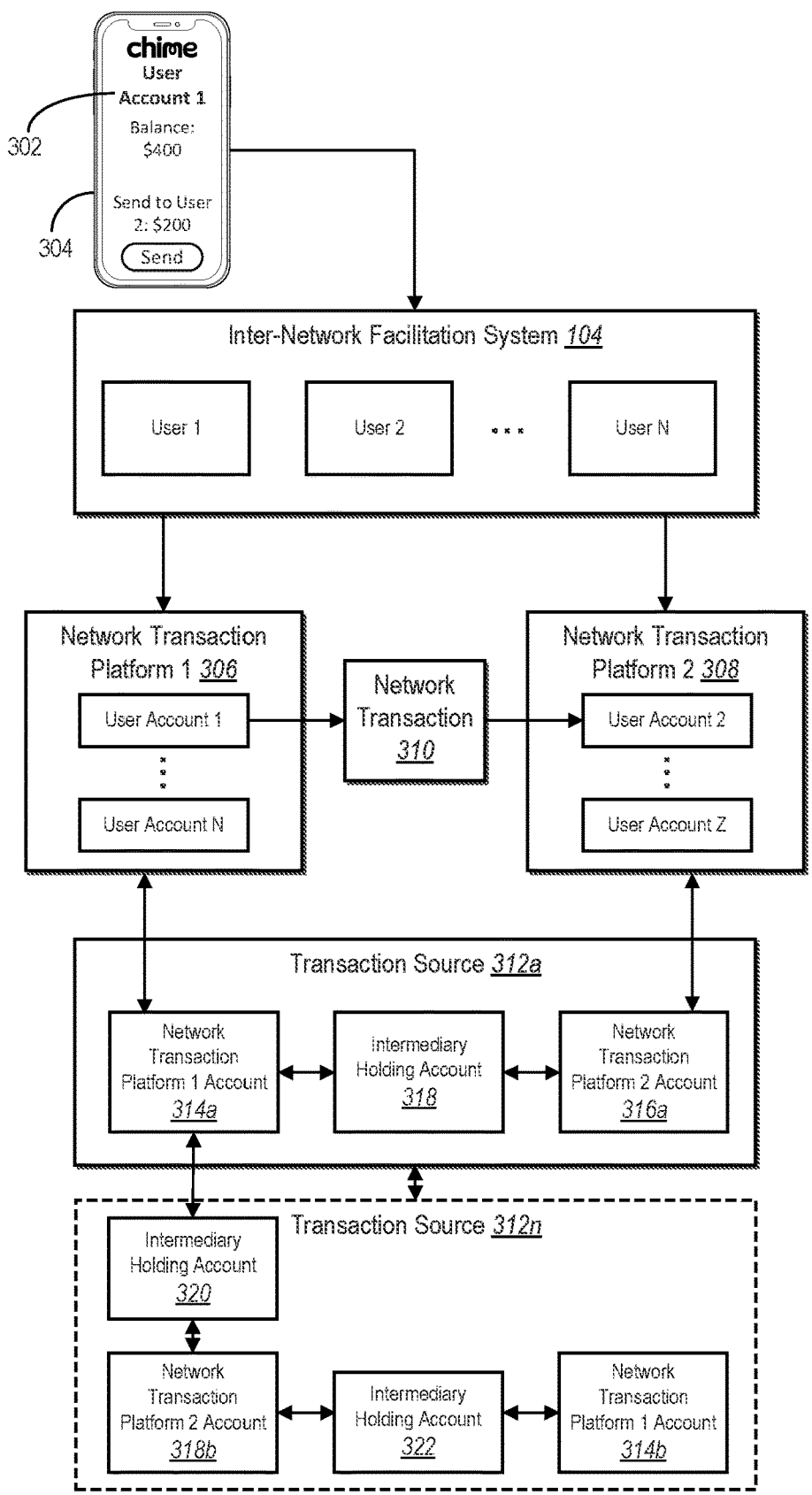
FIG. 3 illustrates a transaction platform coordination system utilizing an intermediary holding account to enable user accounts on different network transaction platforms to perform network transactions in accordance with one or more implementations.

As previously mentioned, the transaction platform coordination system 106 can enable network transactions between user accounts on different network transaction platforms. For example, FIG. 3 illustrates the transaction platform coordination system 106 utilizing an intermediary holding account to enable user accounts on different network transaction platforms to easily and quickly perform a network transaction. Indeed, as shown in FIG. 3, the transaction platform coordination system 106 identifies a requested network transaction between one or more users (within an inter-network facilitation system 104) and utilizes an intermediary holding account within a transaction source to facilitate a network transaction when the user accounts correspond to different network transaction platforms.

As shown in FIG. 3, the inter-network facilitation system 104 hosts (or manages) various user accounts (e.g., for users 1 through users N). In particular, as illustrated by FIG. 3, the inter-network facilitation system 104 enables users to interact with user accounts (e.g., user account 1 through user account N) via a graphical user interface 302 on a client device 304 corresponding to a particular user (e.g., user 1). Indeed, as shown in FIG. 3, the inter-network facilitation system 104 provides, for display, the graphical user interface 302 with selectable options to initiate one or more services or functionalities available via the inter-network facilitation system 104 (e.g., send money to another user account, receive money from another user account, deposit money, withdraw money).

As further shown in FIG. 3, the inter-network facilitation system 104 hosts user accounts that operate on different network transaction platforms. As shown in FIG. 3, the inter-network facilitation system 104 provides users corresponding to user accounts with similar (or same) functionality while, on the back end, various user accounts are hosted or belong to separate network transaction platforms. Indeed, as shown in FIG. 3, the inter-network facilitation system 104 enables functionalities and/or services via graphical user interfaces for user account 1 through user account N via a first network transaction platform 306 and for user account 2 through user account Z via a second network transaction platform 308. In one or more embodiments, the inter-network facilitation system 104 provides functionalities and/or services to various user accounts across a various number of network transaction platforms.

As further shown in FIG. 3, the transaction platform coordination system 106 (via the inter-network facilitation system 104) receives, from a first user account (e.g., user account 1) on the first network transaction platform 306, a request for a network transaction 310 with a second user account (e.g., user account 2) on the second network transaction platform 308. In response, the transaction platform coordination system 106 can transmit instructions to a transaction source 312a (e.g., a transaction computer network) to initiate a transfer of a transactional value for the network transaction 310 from an account 314a corresponding to the first network transaction platform to an intermediary holding account 318 on the transaction source 312a. In addition, the transaction platform coordination system 106 can transmit instructions to the transaction source 312a to receive the transactional value for the network transaction 310 within an account 316a corresponding to the second network transaction platform 308 from the intermediary holding account 318 between the accounts 314a, 316a.

In some embodiments, the transaction platform coordination system 106 updates user account values for the user accounts corresponding to the network transaction 310 upon receiving the request for the network transaction 310 between the user accounts. In certain instances, the transaction platform coordination system 106 separately updates the user account values and causes the inter-network facilitation system 104 to display the updated user account values from providing instructions to the transaction source to initiate a transfer and retrieval of a transactional value between accounts of the multiple network transaction platforms using an intermediary holding account. Indeed, the transaction platform coordination system 106 can enable a real-time (or near real-time) network transaction between user accounts on different network transaction platforms by causing the updates of account values based on the network transaction while separately utilizing an intermediary holding account for the transfer between the accounts of the network transaction platforms. For instance, the transaction platform coordination system 106 can complete the network transaction between accounts of the underlying network transaction platforms (that correspond to the user accounts) at a transaction source separately from updating the account values of the user accounts based on the network transaction request.

In one or more implementations, the transaction platform coordination system 106 instructs the transaction source (e.g., the transaction source 312*a*) to initiate an aggregated transfer of multiple transactional values between a first network transaction platform account (e.g., account 314*a*) and a second network transaction platform account (e.g., account 316*a*). In particular, the transaction platform coordination system 106 can provide multiple instructions to a transaction source for each network transaction request between user accounts. Furthermore, the transaction platform coordination system 106 can instruct the transaction source to aggregate the transaction value for the network transaction requests and then, initiate a transfer from an account corresponding to a first network transaction platform to an intermediary account and initiate a pull (or retrieval) for the aggregated transactional value in the intermediary account by a second network transaction platform.

In one or more embodiments, the transaction platform coordination system 106 causes the transaction source to initiate an automated clearing house (ACH) transaction between the accounts of network transaction platforms and the intermediary holding account to transfer and/or retrieve transactional values between the accounts of the network transaction platforms. In particular, upon receiving one or more network transaction requests from one or more user accounts corresponding to a first network transaction platform to one or more user accounts corresponding to a second network transaction platform, the transaction platform coordination system 106 provides instructions to the transaction source to cause an ACH push of transactional values associated with the transaction request to the intermediary holding account (from an account of the first network transaction platform). In addition, the transaction platform coordination system 106 provides instructions for an ACH pull of the transactional values associated with the transaction request (from an account of the second network transaction platform) (or vice versa). In some cases, the transaction platform coordination system 106 can cause various types of transactional value transfers between accounts, such as, but not limited to wire transfers and/or digital payments.

Moreover, in certain cases, the transaction platform coordination system 106 tracks transactional value amounts from multiple network transaction requests between user accounts of different network transaction platforms to determine an aggregated transactional value to initiate an aggregated transfer. In particular, the transaction platform coordination system 106 can determine a final, aggregated transactional value transferring between user accounts belonging to different network transaction platforms and then, instruct the transaction source to initiate a transfer and retrieval of the aggregated transactional value between accounts of the network transaction platforms using an intermediary holding account.

As an example, the transaction platform coordination system 106 can track that user accounts belonging to a first network transaction platform have requested network transactions with user accounts belonging to a second network transaction platform with an aggregated total transactional value. The transaction platform coordination system 106 can instruct the transaction source to initiate a transfer of the aggregated total of the first transactional value to an intermediary holding account. Moreover, the transaction platform coordination system 106 can instruct the transaction source to initiate a retrieval of the aggregated total of the first transaction value from the intermediary holding account to complete the network transactions between the user accounts belonging to the first network transaction platform and the user accounts belonging to the second network transaction platform.

Additionally, in one or more implementations, the transaction platform coordination system 106 also enables network transactions between user accounts on different network transaction platforms across different transaction sources. For example, in reference to FIG. 3, the transaction platform coordination system 106 can receive a request from a user account belonging to a first user account corresponding to a first network transaction platform hosted on a first transaction source (e.g., the transaction source 312*a*) to initiate a network transaction with another user account belonging to a second user account corresponding to a second network transaction platform hosted on a second transaction source (e.g., the transaction source 312*n*).

Subsequently, as shown in FIG. 3, the transaction platform coordination system 106 can provide instructions to the transaction source 312*a* to transfer, from the account 314*a* of the first network transaction platform, a transactional value to an intermediary holding account 320 on the transaction source 312*n* between the account 314*a* of the first network transactional platform and an account 316*b* of the second network transaction platform. In addition, the transaction platform coordination system 106 can provide instructions to the transaction source 312*n* to cause retrieve a transactional value, by the account 316*b* of the second network transaction platform, from the intermediary holding account 320 between the account 314*a* of the first network transactional platform and the account 316*b* of the second network transaction platform across the transaction source 312*a* and the transaction source 312*n* (or vice versa). Indeed, in one or more embodiments, the transaction platform coordination system 106 enables user account network transactions between multiple network transaction platforms on a various number of transaction sources. Additionally, the transaction platform coordination system 106 can also facilitate network transactions between user accounts belonging to the transaction source 312*n* on different network transaction platforms using an intermediary holding account 322 (e.g., between an account 314*b* of the first network transaction platform and the account 316*b* of the second network transaction platform).

In some cases, the transaction platform coordination system 106 enables user account network transactions between more than two network transaction platforms. For instance, the transaction platform coordination system 106 can facilitate an intermediary holding account between a first network transaction platform and a second network transaction platform, a second intermediary holding account between the first network transaction platform and a third network transaction platform, and a third intermediary holding account between a second network transaction platform and a third network transaction platform. Indeed, the transaction platform coordination system 106 can receive network transaction requests between various combinations of user accounts corresponding to the first, second, and third network transaction platforms and instruct movement of transactional values using the intermediary holding accounts between the first, second, and third network transaction platforms. Indeed, the transaction platform coordination system 106 can instruct movement between the intermediary holding accounts between the first, second, and third network transaction platforms while instantly updating account values of the user accounts on a front end based on the network transaction requests.

Indeed, the transaction platform coordination system 106 can enable user account network transactions between various combinations of network transaction platforms and transaction sources (corresponding to the various user accounts). In particular, in one or more embodiments, the transaction platform coordination system 106 establishes or manages intermediary holding accounts between various combinations of network transaction platforms accounts (at the same transaction source or across different transaction sources). Accordingly, in one or more embodiments, the transaction platform coordination system 106 enables user account network transactions between user accounts hosted on different network transaction platforms and/or different transaction sources without user accounts from experiencing a difference in network transaction platforms and/or transaction sources (on the front-end user interface).

Additionally, in some embodiments, the transaction platform coordination system 106 enables network transactions between user accounts corresponding to the same user while being hosted on different network transaction platforms and/or different transaction sources. For example, the inter-network facilitation system 104 can manage (or host) multiple user accounts for a user (e.g., a savings and checking account) using two different network transaction platforms. Upon receiving a user interaction requesting a network transaction between user accounts of the user that utilize two different network transaction platforms, the transaction platform coordination system 106 can utilize an intermediary holding account (in accordance with one or more implementations herein) to facilitate the network transaction between the user accounts.

Furthermore, in one or more embodiments, the transaction platform coordination system 106 enables network transactions from a user account comprising (or associated with) multiple users (e.g., a joint user account) while tracking identifiable user activity. For example, a user account can include multiple users comprising separate user profiles and/or user identifiers. Indeed, the transaction platform coordination system 106 can assign each user of a user account with a universally unique identifier (UUID) and/or a profile ID. Then, the transaction platform coordination system 106 can track user activity based on the UUID and/or profile ID (e.g., based on log in information and/or device information) and can attribute a user activity (e.g., a request to initiate a network transaction, modify a user account attribute) to the particular UUID and/or profile ID that is specific to one user from users of a user account. Indeed, the transaction platform coordination system 106 can utilize the UUID and/or profile ID to identify a specific user as the acting user for a user activity (e.g., a network transaction and/or user account attribute modification).

In some cases, the transaction platform coordination system 106 utilizes various combinations of UUIDs and/or profile IDs to attribute the user activity to the particular user at the multiple network transaction platforms and/or the transaction source associated to the user account. For instance, the transaction platform coordination system 106 can propagate information on the user activity and information on the performing user (via the UUID and the network) to one or more other related accounts to modify or update the user attributes (or user activities) on other user accounts related to the user account across different network transaction platforms. In one or more embodiments, the transaction platform coordination system 106 propagates attributions of users to activities, such as network transaction requests and/or user account attribute modifications to different transaction sources and/or network transaction platforms using schematized data messages (in accordance with one or more implementations herein).

Figure 4:
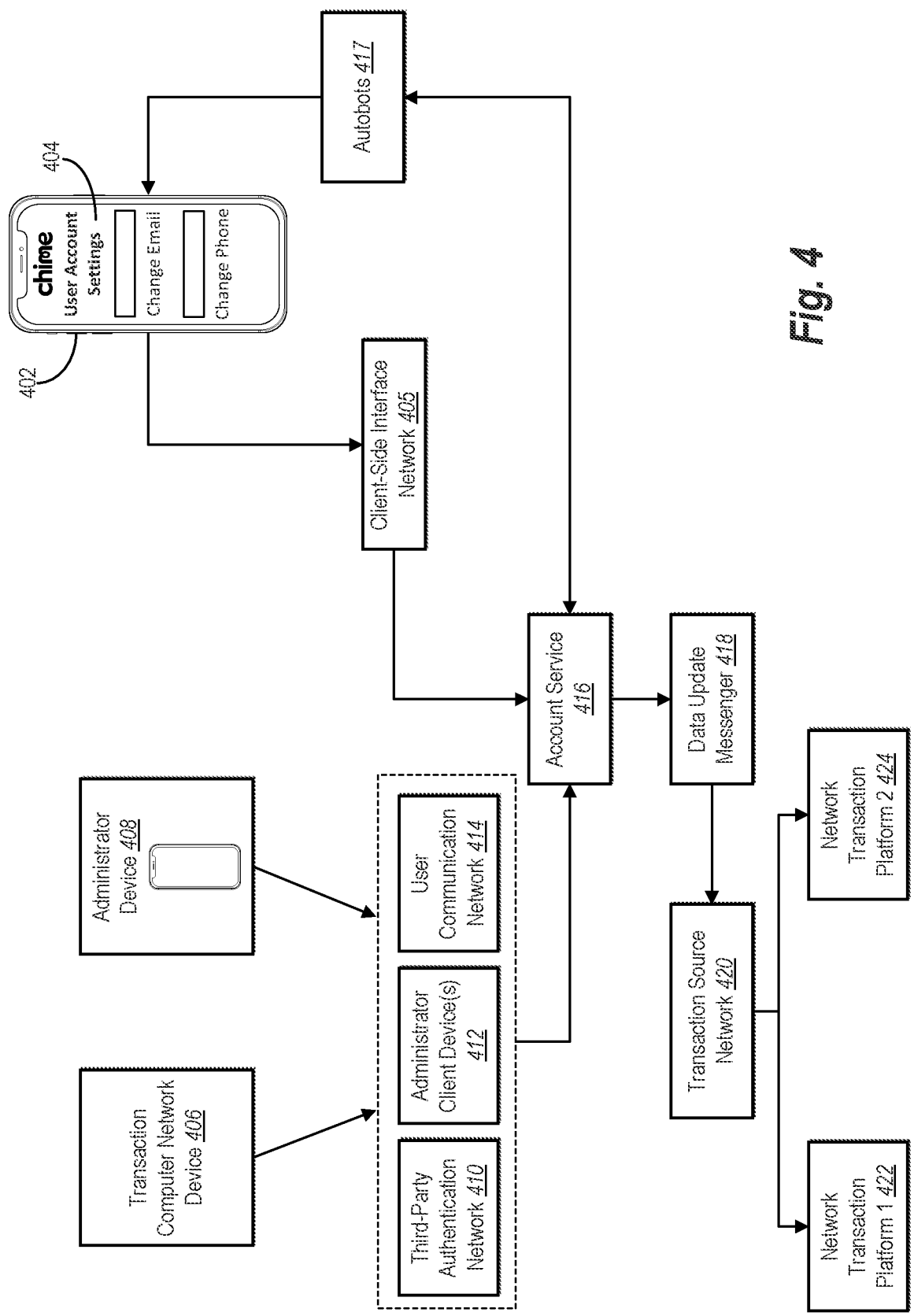
FIG. 4 illustrates a transaction platform coordination system utilizing a data update messenger to unify user account modifications between user accounts at different network transaction platforms in accordance with one or more implementations.

As previously mentioned, the transaction platform coordination system 106 can unify user account modifications across user accounts on different network transaction platforms. In particular, FIG. 4 illustrates the transaction platform coordination system 106 utilizing a data update messenger to unify user account modifications between various sources, such as, but not limited to different network transaction platforms, transaction computer network devices, and/or client devices. For instance, in relation to FIG. 4, the transaction platform coordination system 106 receives user activity from a client device (or a transaction computer network device), provides the user activity to a data update messenger that sends a schematized data message to other sources. Then, in relation to FIG. 4, the receiving network transaction platforms utilize the data update messenger to identify related user accounts and modify user attributes based on the user activity for the related user accounts at the network transaction platforms.

For example, as shown in FIG. 4, the inter-network facilitation system 104 (and/or the transaction platform coordination system 106) provides, for display on a client device 402, a graphical user interface 404 with selectable options to modify user account attributes for a user account. Indeed, the inter-network facilitation system 104 (and/or the transaction platform coordination system 106) can provide various options, on the client device 402, to modify various user account attributes corresponding to the user account (e.g., change of address, change of contact information, change of password, change of notification settings). In some cases, the inter-network facilitation system 104 (and/or the transaction platform coordination system 106) can also receive and identify various user activities corresponding to the user account (e.g., transaction activities, login activity).

In one or more embodiments, in reference to FIG. 4, the transaction platform coordination system 106 utilizes a client-side interface network 405 to relay (or transmit) the user activities (as described above) from the client device to an account service 416. Indeed, the account service 416 can include a network (or a collection of computer devices) that uses a protocol to send and/or receive interactions from users (e.g., from the client device 402), administrators (e.g., from the administrator device 408), and/or transaction computer network devices (e.g., the transaction computer network devices 406). In some cases, the transaction platform coordination system 106 enables the users (e.g., from the client device 402), administrators (e.g., from the administrator device 408), and/or transaction computer network devices (e.g., the transaction computer network devices 406) to access a user database that includes user account information and/or data for the inter-network facilitation system 104.

Upon detecting a user activity, interaction, and/or a user account attribute modification for a user account from the client device 402, the administrator device 408, and/or the transaction computer network devices 406, the transaction platform coordination system 106 utilizes a data update messenger 418 to propagate the user activity, interaction, and/or a user account attribute to other user accounts related to the user account. For instance, the transaction platform coordination system 106 can transmit a schematized data message through the data update messenger to one or more transaction source networks 420 which may utilize more than one network transaction platforms. In particular, as shown in FIG. 4, the transaction platform coordination system 106 can transmit a data update message from the data update messenger 418 to provide the information corresponding to the user activity, interaction, and/or user account attribute modification for the user account to other related user accounts hosted on the network transaction platform 422 and the network transaction platform 424.

For example, the transaction platform coordination system 106 can provide a schematized data message that indicates that a user account changed a user attribute to a transaction source network 420. In addition, the transaction platform coordination system 106 can cause the transaction source network 420 to identify one or more additional user accounts associated with the user account for the schematized data message. Indeed, in some cases, the transaction platform coordination system 106 (and/or the transaction source network 420) utilizes matching records, UUIDs, profile IDs, and/or a database that represents relationships between user accounts to identify one or more related user accounts.

In one or more embodiments, the transaction platform coordination system 106 causes the transaction source network 420 to identify a first user account associated with the first network transaction platform 422 and a second user account associated with the second network transaction platform 424 that are both related to the user account from the schematized data message. Then, the transaction platform coordination system 106 can cause the first network transaction platform 422 to modify user attributes of the first user account in accordance with user activity and/or modifications indicated in the schematized data message. Moreover, the transaction platform coordination system 106 can also cause the second network transaction platform 424 to modify user attributes of the second user account in accordance with activity and/or modifications indicated in the schematized data message.

Furthermore, the transaction platform coordination system 106 can cause various numbers of network transaction platforms to update (or modify) user account attributes upon receiving a schematized data message indicating a user attribute modification (or user activity). In addition, the transaction platform coordination system 106 can cause various numbers of transaction source networks to identify user accounts and update user accounts (through one or more network transaction platforms) upon receiving a schematized data message indicating a user attribute modification (or user activity). In addition, in some cases, the transaction platform coordination system 106 causes various numbers of user accounts to be updated via the schematized data message.

In addition to receiving a user attribute modification from a client device, in some embodiments, the transaction platform coordination system 106 receives, from one or more other sources, and propagates modifications and/or updates to user account attributes. For example, the transaction platform coordination system 106 can receive a user account attribute modification (or update) from a transaction computer network device 406 and/or an administrator device 408. Then, the transaction platform coordination system 106 can utilize the data update messenger 418 to transmit a schematized data message indicating the user account attribute modification (or update) to one or more related user accounts hosted on (or belonging to) one or more network transaction platforms and/or transaction network sources. Additionally, in some cases, the transaction platform coordination system 106 can also utilize the data update messenger to provide schematized data messages to the transaction computer network device 406, the administrator device 408, and/or the client device 402 to indicate a user account attribute modification (or update).

In some cases, the transaction platform coordination system 106 utilizes various protocols or formats for the schematized data update message. For example, the transaction platform coordination system 106 can utilize a protocol buffer message that communicates structured data as the schematized data update message. In certain instances, the transaction platform coordination system 106 can utilize data messages, such as, but not limited to JavaScript Object Notation (JSON)-based data and/or extensible markup language (XML)-based messages.

In some embodiments, the transaction platform coordination system 106 utilizes a subscriber push and queue approach to exchange schematized data messages from the data update messenger 418. For example, the transaction platform coordination system 106 can enable one or more of the transaction source network(s) 420, the transaction computer network device 406, the administrator device 408, and/or the client device 402 as subscribers to the data update messenger 418. Then, the transaction platform coordination system 106 utilizes the data update messenger 418 to push data messages to the subscribers (e.g., without requiring a request to pull).

In addition, the transaction platform coordination system 106 can utilize the data update messenger 418 as a persistent queue of schematized data messages. Indeed, the transaction platform coordination system 106 can enable the data update messenger 418 to queue the schematized data messages such that the data messages (indicating user account activity and/or changes) can be accessed by one or more applications or networks at a future time. For example, the transaction platform coordination system 106 can utilize the data update messenger 418 to transmit data messages within the persistent queue to a new subscriber added to listen for updates on the data update messenger 418.

Furthermore, in some embodiments and as shown in FIG. 4, the transaction platform coordination system 106 can enable communications between the transaction computer network device 406, the administrator device 408, the client device 402, and the transaction source network 420 via a third-party authentication network 410. In particular, the third-party authentication network 410 can authenticate a requesting source (e.g., one of the transaction computer network device(s) 406, the administrator device 408, the client device 402, or the transaction source network 420) and enable the requesting source to pull (or retrieve) information for a specific user account that is associated with the requesting source (e.g., via ownership of the user account and/or admin access to the user account). For example, the third-party authentication network 410 can utilize approaches, such as, but not limited to token authentication, two-factor authentication, and/or password authentication to authenticate a requesting source prior to enabling retrieval of information for a specific user account. In some cases, the transaction computer network device 406, the administrator device 408, the client device 402, or the transaction source network 420 can utilize the third-party authentication network 410 to view or update user account attribute data.

Furthermore, as shown in FIG. 4, the transaction platform coordination system 106 can enable various administrator client device(s) 412 to communicate with the transaction computer network device 406, the client device 402, the transaction source network 420 (e.g., via account service 416 and/or data update messenger 418). Indeed, the administrator client device(s) 412 can include administrator devices corresponding to the inter-network facilitation system 104 and can modify user accounts through admin access.

In addition, the transaction platform coordination system 106 can also enable the client device 402 to communicate one or more updates and/or service requests via a user communication network 414. In particular, the user communication network 414 can include a service platform that receives and communicates various service requests, technical tickets, and/or customer service messages from the client device 402 to the administrator device 408 and/or the transaction computer network device 406. In some cases, the transaction platform coordination system 106 can propagate communications and/or user attribute modifications made via the user communication network 414 through the data update messenger 418 (in accordance with one or more implementations herein).

Additionally, the transaction platform coordination system 106 can communicate one or more informational updates and/or automated services for a user account to a client device. For instance, with reference to FIG. 4, in some cases, the transaction platform coordination system 106 can communicate informational updates and/or automated services to the client device 402 for a user account via autobots 417. Indeed, the transaction platform coordination system 106 can receive informational account updates (e.g., transaction activity updates, account balances) and/or automated services (e.g., application software updates, graphical user interface updates, account setting updates) from the transaction computer network device 406, administrator device 408, and/or the transaction source network 420 through the autobots 417.

In one or more embodiments, the transaction platform coordination system 106 utilizes the data update messenger to transmit schematized data messages to the transaction computer network device 406, administrator device 408, the transaction source network 420, and/or the client device 402 asynchronously. For instance, the transaction platform coordination system 106 asynchronously transmits schematized data messages upon receiving a signaled change corresponding to a user account within one of the actors of the environment (as shown in FIG. 4). For example, the transaction platform coordination system 106 can asynchronously transmit schematized data messages upon receiving signals, such as, but not limited to a user activity from the client device 402, a setting modification from the administrator device 408, and/or an account value modification from the transaction source network 420.

In some embodiments, the transaction platform coordination system 106 can utilize received user account attribute modifications and/or other user activity to directly update profiles within a network transaction platform by storing and/or transferring available user account profiles to the network transaction platform. Then, the transaction platform coordination system 106 can asynchronously update other network transaction platforms using the user account attribute modifications and/or other user activity. In some cases, the transaction platform coordination system 106 directly communicates identified user account attribute modifications and/or other user activity to the network transaction platforms (instead of through transaction source networks) and enable the network transaction platforms to identify and update other user accounts related to the changed user account.

Figure 5:
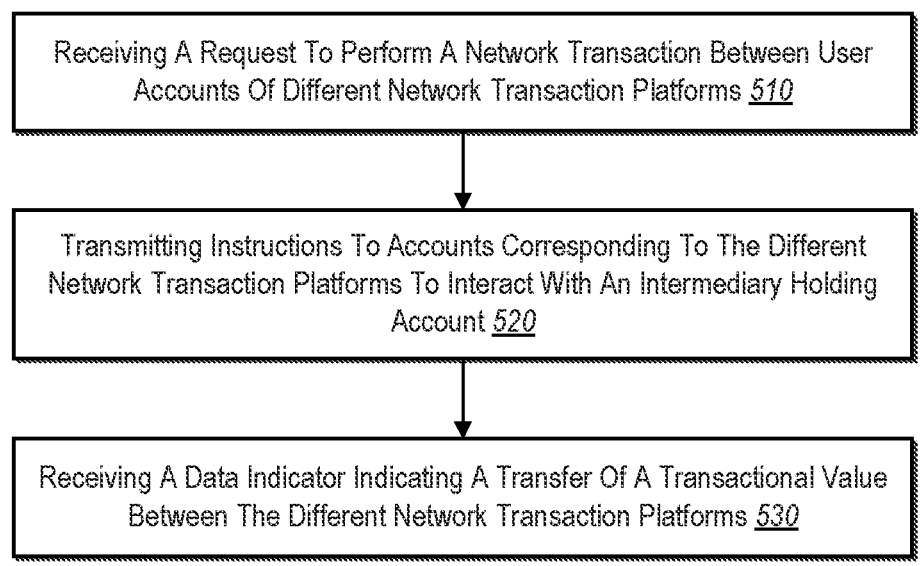
FIG. 5 illustrates a flowchart of series of acts for enabling and unifying network transactions and account attribute modifications between user accounts on different network transaction platforms in accordance with one or more implementations.

Turning now to FIG. 5, this figure shows a flowchart of a series of acts 500 for enabling and unifying network transactions and account attribute modifications between user accounts on different network transaction platforms in accordance with one or more implementations. While FIG. 5 illustrates acts according to one embodiment, alternative embodiments may omit, add to, reorder, and/or modify any of the acts shown in FIG. 5. The acts of FIG. 5 can be performed as part of a method. Alternatively, a non-transitory computer readable storage medium can comprise instructions that, when executed by the one or more processors, cause a computing device to perform the acts depicted in FIG. 5. In still further embodiments, a system can perform the acts of FIG. 5.

As shown in FIG. 5, the series of acts 500 include an act 510 of receiving a request to perform a network transaction between user accounts of different network transaction platforms. For example, the act 510 can include receiving a request to perform a network transaction between a first user account corresponding to a first network transaction platform and a second user account corresponding to a second network transaction platform. In addition, the act 510 can include transmitting instructions to a first network transaction platform to cause the first network transaction platform to modify a first user account value corresponding to a first user account based on a transactional value of a network transaction. In some cases, a network transaction between a first user account and a second user account includes a peer-to-peer network transaction request, an inter-bank network transaction request, or an intra-bank network transaction request. Furthermore, in some cases, the act 510 includes receiving a request to modify a user attribute for a first user account corresponding to a first network transaction platform. For example, a user attribute can include a user phone number, a user email, a user address, or a user account setting.

In addition, the act 510 can include transmitting instructions to a second network transaction platform to cause the second network transaction platform to modify a second user account value corresponding to a second user account based on a transactional value of a network transaction. For instance, a first user account can correspond to a first transactional source computer network and a second user account can correspond to a second transactional source computer network. Moreover, a transactional source computer network can include a computing device for a banking account or a credit account. Additionally, the act 510 can include identifying a user identifier corresponding to the request to perform a network transaction from multiple user identifiers for a first user account and providing, for display within a graphical user interface corresponding to the first user account, an indication that a user corresponding to the user identifier initiated the request to perform the network transaction.

In some cases, the act 510 can further include receiving an additional request to perform an additional network transaction between a first user account corresponding to a first network transaction platform and a third user account corresponding to a third network transaction platform.

Furthermore, as shown in FIG. 5, the series of acts 500 include an act 520 of transmitting instructions to accounts corresponding to the different network transaction platforms to interact with an intermediary holding account. For example, the act 520 can include transmitting instructions to a first network transaction platform to cause a first network transaction platform to initiate transfer of a transactional value for a network transaction from an account of the first network transaction platform to at least one intermediary holding account. Moreover, the act 520 can include transmitting instructions to a second network transaction platform to cause a second network transaction platform to receive a transactional value from at least one intermediary holding account for a network transaction at an account of a second network transaction platform. In some instances, the act 520 can include initiating an aggregated transfer of multiple transactional values between an account of a first network transaction platform and an account of a second network transaction platform utilizing at least one intermediary holding account.

In some cases, at least one intermediary holding account, a first user account, and a second user account correspond to a transactional source computer network that communicates with both a first network transaction platform and a second network transactional platform. Moreover, in some instances, a second user account corresponds to a second transaction source computer network that communicates with a second network transaction platform.

Furthermore, the act 520 can include transmitting instructions to a second network transaction platform to cause the second network transaction platform to modify a user attribute for a second user account upon determining that a first user account is associated with the second user account. Moreover, the act 520 can include requesting user attributes corresponding to a first user account and a second user account from a third-party authentication network to cause the third-party authentication network to access user attributes from a first network transaction platform and a second network transaction platform.

In addition, as shown in FIG. 5, the series of acts 500 include an act 530 of receiving a data indicator indicating a transfer of a transactional value between the different network transaction platforms. For instance, the act 530 can include receiving a data indicator indicating a transfer of a transactional value between a first user account corresponding to a first network transaction platform and a second user account corresponding to a second network transaction platform utilizing at least one intermediary holding account. For example, a data indicator can indicate an account value of at least one intermediary holding account. Moreover, the act 530 can include receiving an additional data indicator of an additional transfer of an additional transactional value between a first user account corresponding to a first network transaction platform and a third user account corresponding to a third network transaction platform utilizing an additional intermediary holding account from at least one intermediary holding account.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
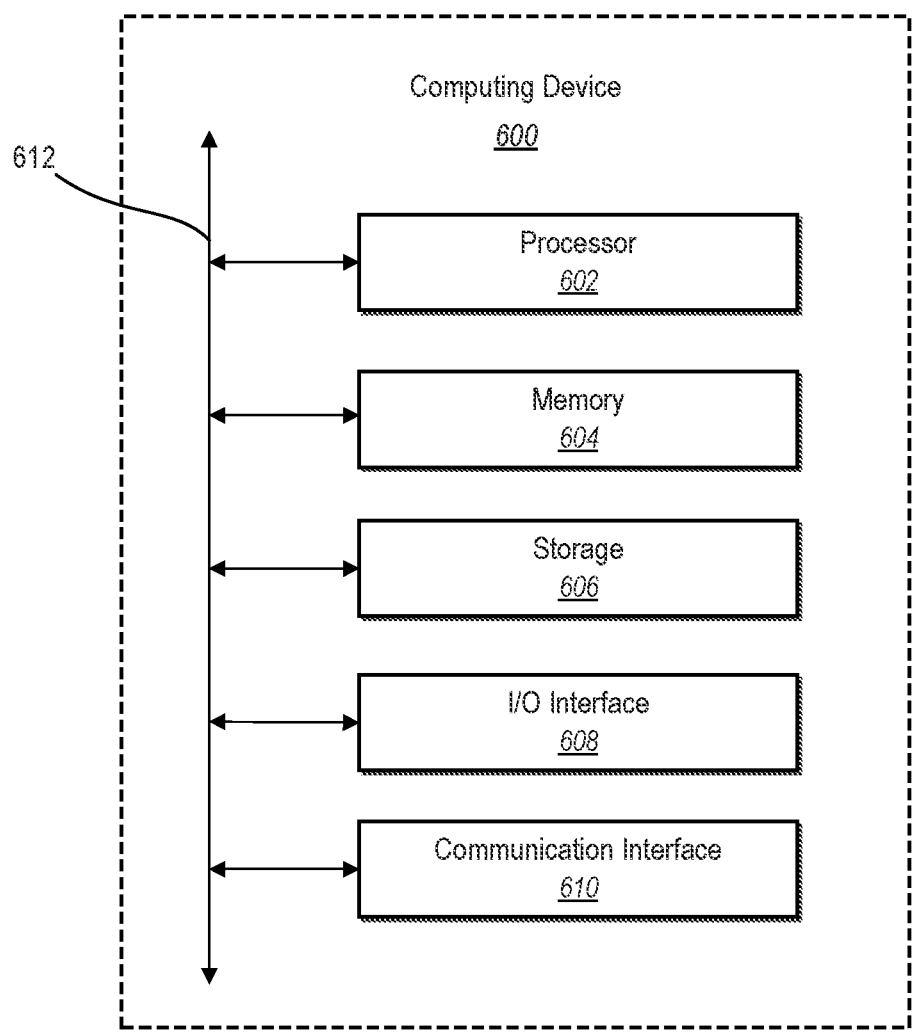
FIG. 6 illustrates a block diagram of an exemplary computing device in accordance with one or more implementations.

FIG. 6 illustrates, in block diagram form, an exemplary computing device 600 that may be configured to perform one or more of the processes described above. One will appreciate that the transaction platform coordination system 106 (or the inter-network facilitation system 104) can comprise implementations of a computing device, including, but not limited to, the devices or systems illustrated in the previous figures. As shown by FIG. 6, the computing device can comprise a processor 602, memory 604, a storage device 606, an I/O interface 608, and a communication interface 610. In certain embodiments, the computing device 600 can include fewer or more components than those shown in FIG. 6. Components of computing device 600 shown in FIG. 6 will now be described in additional detail.

In particular embodiments, processor(s) 602 includes hardware for executing instructions, such as those making up a computer program. As an example, and not by way of limitation, to execute instructions, processor(s) 602 may retrieve (or fetch) the instructions from an internal register, an internal cache, memory 604, or a storage device 606 and decode and execute them.

The computing device 600 includes memory 604, which is coupled to the processor(s) 602. The memory 604 may be used for storing data, metadata, and programs for execution by the processor(s). The memory 604 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 604 may be internal or distributed memory.

The computing device 600 includes a storage device 606 includes storage for storing data or instructions. As an example, and not by way of limitation, storage device 606 can comprise a non-transitory storage medium described above. The storage device 606 may include a hard disk drive ("HDD"), flash memory, a Universal Serial Bus ("USB") drive or a combination of these or other storage devices.

The computing device 600 also includes one or more input or output ("I/O") interface 608, which are provided to allow a user (e.g., requester or provider) to provide input to (such as user strokes), receive output from, and otherwise transfer data to and from the computing device 600. These I/O interface 608 may include a mouse, keypad or a keyboard, a touch screen, camera, optical scanner, network interface, modem, other known I/O devices or a combination of such I/O interface 608. The touch screen may be activated with a stylus or a finger.

The I/O interface 608 may include one or more devices for presenting output to a user, including, but not limited to, a graphics engine, a display (e.g., a display screen), one or more output providers (e.g., display providers), one or more audio speakers, and one or more audio providers. In certain embodiments, the I/O interface 608 is configured to provide graphical data to a display for presentation to a user. The graphical data may be representative of one or more graphical user interfaces and/or any other graphical content as may serve a particular implementation.

The computing device 600 can further include a communication interface 610. The communication interface 610 can include hardware, software, or both. The communication interface 610 can provide one or more interfaces for communication (such as, for example, packet-based communication) between the computing device and one or more other computing devices 600 or one or more networks. As an example, and not by way of limitation, communication interface 610 may include a network interface controller ("NIC") or network adapter for communicating with an Ethernet or other wire-based network or a wireless NIC ("WNIC") or wireless adapter for communicating with a wireless network, such as a WI-FI. The computing device 600 can further include a bus 612. The bus 612 can comprise hardware, software, or both that couples components of computing device 600 to each other.

Figure 7:
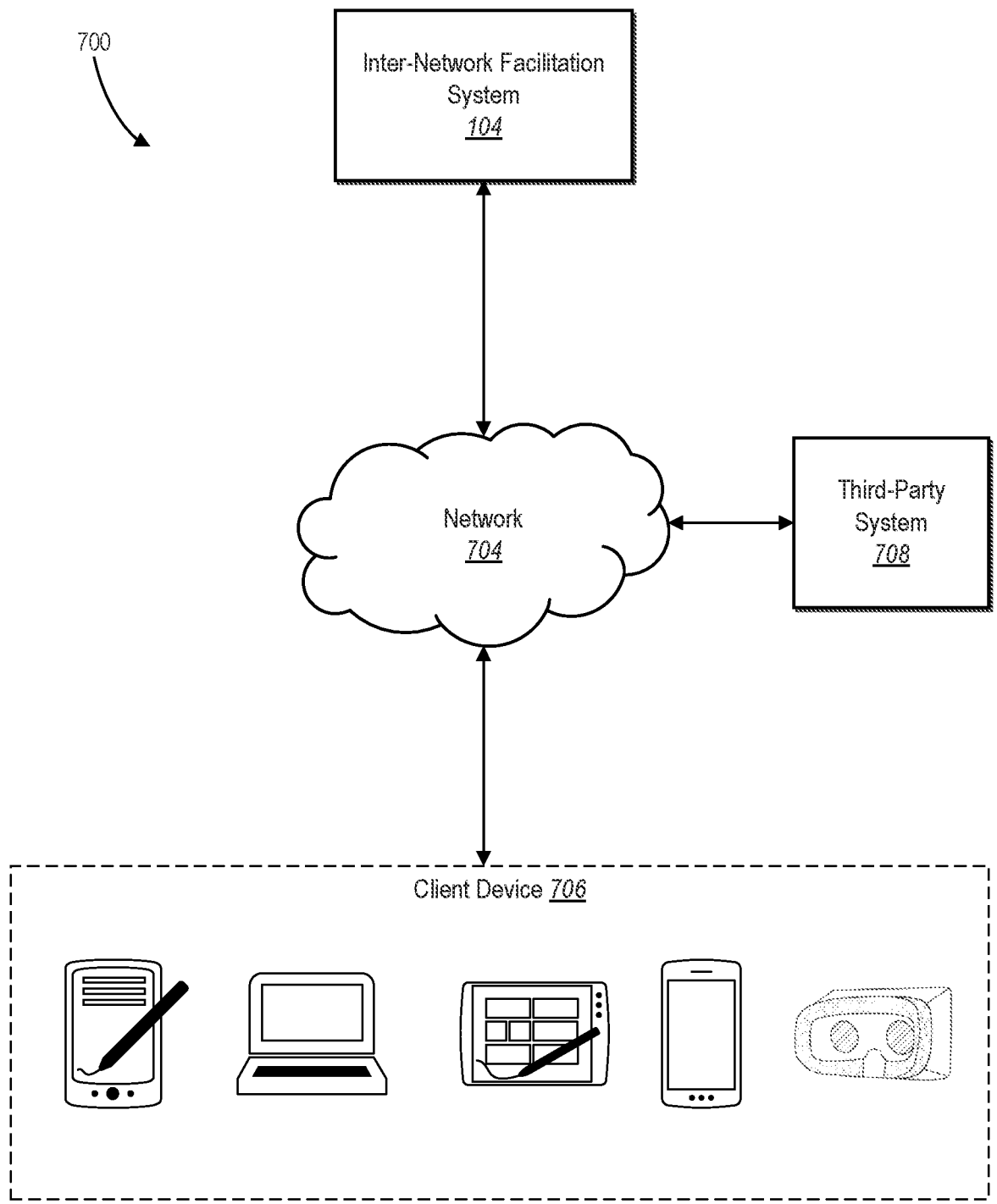
FIG. 7 illustrates an example environment for an inter-network facilitation system in accordance with one or more implementations.

FIG. 7 illustrates an example network environment 700 of the inter-network facilitation system 104. The network environment 700 includes a client device 706 (e.g., client devices 114a-114n), an inter-network facilitation system 104, and a third-party system 708 connected to each other by a network 704. Although FIG. 7 illustrates a particular arrangement of the client device 706, the inter-network facilitation system 104, the third-party system 708, and the network 704, this disclosure contemplates any suitable arrangement of client device 706, the inter-network facilitation system 104, the third-party system 708, and the network 704. As an example, and not by way of limitation, two or more of client device 706, the inter-network facilitation system 104, and the third-party system 708 communicate directly, bypassing network 704. As another example, two or more of client device 706, the inter-network facilitation system 104, and the third-party system 708 may be physically or logically co-located with each other in whole or in part.

Moreover, although FIG. 7 illustrates a particular number of client devices 706, inter-network facilitation systems 104, third-party systems 708, and networks 704, this disclosure contemplates any suitable number of client devices 706, inter-network facilitation system 104, third-party systems 708, and networks 704. As an example, and not by way of limitation, network environment 700 may include multiple client devices 706, inter-network facilitation system 104, third-party systems 708, and/or networks 704.

This disclosure contemplates any suitable network 704. As an example, and not by way of limitation, one or more portions of network 704 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 704 may include one or more networks 704.

Links may connect client device 706, inter-network facilitation system 104 (e.g., which hosts the transaction platform coordination system 106), and third-party system 708 to network 704 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 700. One or more first links may differ in one or more respects from one or more second links.

In particular embodiments, the client device 706 may be an electronic device including hardware, software, or embedded logic components or a combination of two or more such components and capable of carrying out the appropriate functionalities implemented or supported by client device 706. As an example, and not by way of limitation, a client device 706 may include any of the computing devices discussed above in relation to FIG. 6. A client device 706 may enable a network user at the client device 706 to access network 704. A client device 706 may enable its user to communicate with other users at other client devices 706.

In particular embodiments, the client device 706 may include a requester application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 706 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 706 one or more Hyper Text Markup Language ("HTML") files responsive to the HTTP request. The client device 706 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 704) to link the third-party-system 708. For example, the inter-network facilitation system 104 may receive authentication credentials from a user to link a third-party system 708 such as an online bank account, credit account, debit account, or other financial account to a user account within the inter-network facilitation system 104. The inter-network facilitation system 104 can subsequently communicate with the third-party system 708 to detect or identify balances, transactions, withdrawal, transfers, deposits, credits, debits, or other transaction types associated with the third-party system 708. The inter-network facilitation system 104 can further provide the aforementioned or other financial information associated with the third-party system 708 for display via the client device 706. In some cases, the inter-network facilitation system 104 links more than one third-party system 708, receiving account information for accounts associated with each respective third-party system 708 and performing operations or transactions between the different systems via authorized network connections.

In particular embodiments, the inter-network facilitation system 104 may interface between an online banking system and a credit processing system via the network 704. For example, the inter-network facilitation system 104 can provide access to a bank account of a third-party system 708 and linked to a user account within the inter-network facilitation system 104. Indeed, the inter-network facilitation system 104 can facilitate access to, and transactions to and from, the bank account of the third-party system 708 via a client application of the inter-network facilitation system 104 on the client device 706. The inter-network facilitation system 104 can also communicate with a credit processing system, an ATM system, and/or other financial systems (e.g., via the network 704) to authorize and process credit charges to a credit account, perform ATM transactions, perform transfers (or other transactions) across accounts of different third-party systems 708, and to present corresponding information via the client device 706.

In particular embodiments, the inter-network facilitation system 104 includes a model for approving or denying transactions. For example, the inter-network facilitation system 104 includes a transaction approval machine learning model that is trained based on training data such as user account information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 708), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 700 either directly or via network 704. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by the server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 706, or an inter-network facilitation system 104 to manage, retrieve, modify, add, or delete, the information stored in a data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 704.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles for transportation providers and/or transportation requesters. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 706. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 706. Information may be pushed to a client device 706 as notifications, or information may be pulled from client device 706 responsive to a request received from client device 706. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 706 associated with users.

In addition, the third-party system 708 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 704. A third-party system 708 can communicate with the inter-network facilitation system 104 to provide financial information pertaining to balances, transactions, and other information, whereupon the inter-network facilitation system 104 can provide corresponding information for display via the client device 706. In particular embodiments, a third-party system 708 communicates with the inter-network facilitation system 104 to update account balances, transaction histories, credit usage, and other internal information of the inter-network facilitation system 104 and/or the third-party system 708 based on user interaction with the inter-network facilitation system 104 (e.g., via the client device 706). Indeed, the inter-network facilitation system 104 can synchronize information across one or more third-party systems 708 to reflect accurate account information (e.g., balances, transactions, etc.) across one or more networked systems, including instances where a transaction (e.g., a transfer) from one third-party system 708 affects another third-party system 708.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method for coordinating cross-platform transactions, the method comprising:

deploying, in an electronic computing network, a server computing device comprising a cross-platform transaction coordination system communicating with a plurality of network transaction platforms, wherein each network transaction platform comprises a plurality of financial source computing devices for holding financial resources in accounts associated with users of the cross-platform transaction coordination system, wherein the cross-platform transaction coordination system is configured for electronic communication with a plurality of user computing devices associated with the users of the cross-platform transaction coordination system and with the plurality of financial source computing devices;

transmitting, by the cross-platform transaction coordination system, to the plurality of user computing devices, an application for execution on the plurality of user computing devices, wherein the application is configured to generate an interface on display of the plurality of user computing devices for digital interactions of user financial transactions;

establishing and managing, by the cross-platform transaction coordination system, a plurality of intermediary holding accounts with various combinations of the network transaction platforms, wherein the intermediary holding accounts are configured to enable network transactions between users on the network transaction platforms;

registering, by the cross-platform transaction coordination system, a first user account corresponding to a first network transaction platform wherein the first network transaction platform is configured for electronic communication with other computer devices according to a first collection of data schemas, wherein each data schema comprises source code and/or network communication protocols for exchanging financial instructions, messages, or objects with other computing devices;

registering, by the cross-platform transaction coordination system, a second user account corresponding to a second network transaction platform wherein the second network transaction platform is configured for electronic communication with other computer devices according to a second collection of data schemas differing from the first collection of data schemas and wherein the first user account is different from the second user account;

receiving, by the cross-platform transaction coordination system, from a first user computing device associated with the first user account via an input on the interface of the first user computing device, a request to perform a network transaction between the first user account corresponding to the first network transaction platform and the second user account corresponding to the second network transaction platform; and based on an inability to communicate network transactions via a specific or dedicated one-to-one communication protocol between the first network transaction platform and the second network transaction platform:

transmitting, by the cross-platform transaction coordination system, a first set of instructions to the first network transaction platform to cause the first network transaction platform to initiate transfer of a transactional value for the network transaction from an account of the first network transaction platform to at least one intermediary holding account without communicating the first set of instructions to the second network transaction platform, wherein the intermediary holding account is associated with the second network transaction platform, wherein the first set of instructions comprise a schematized data message according to a data schema of the first collection of data schemas, and wherein the transactional value and transaction attributes are objects of the schematized data message;

transmitting, by the cross-platform transaction coordination system, a second set of instructions to the second network transaction platform to cause the second network transaction platform to receive the transactional value from the at least one intermediary holding account for the network transaction at an account of the second network transaction platform without communicating the second set of instructions to the first network transaction platform, wherein the second set of instructions comprise a schematized data message according to a data schema of the second collection of data schemas and wherein the transactional value and the transaction attributes are objects of the schematized data message; and receiving, by the cross-platform transaction coordination system, from a financial source computing device of the plurality of financial source computing devices hosting the intermediary holding account, a data indicator indicating a transfer of the transactional value between the first user account corresponding to the first network transaction platform and the second user account corresponding to the second network transaction platform utilizing the at least one intermediary holding account.

2. The computer-implemented method of claim 1, further comprising:

transmitting instructions to the first network transaction platform to cause the first network transaction platform to modify a first user account value corresponding to the first user account based on the transactional value of the network transaction; and transmitting instructions to the second network transaction platform to cause the second network transaction platform to modify a second user account value corresponding to the second user account based on the transactional value of the network transaction.

3. The computer-implemented method of claim 1, wherein the first network transaction platform comprises a first communication protocol and the second network transaction platform comprises a second communication protocol differing from the first communication protocol.

4. The computer-implemented method of claim 1, wherein:
the first user account corresponds to a first transactional source computer network comprising a first computing device for a first banking account or a first credit account; and
the second user account corresponds to a second transactional source computer network comprising a second computing device for a second banking account or a second credit account.

5. The computer-implemented method of claim 1, wherein the request to perform the network transaction between the first user account and the second user account comprises a peer-to-peer network transaction request, an inter-bank network transaction request, or an intra-bank network transaction request.

6. The computer-implemented method of claim 1, further comprising:
identifying a user identifier corresponding to the request to perform the network transaction from multiple user identifiers for the first user account; and
providing, for display within graphical user interface corresponding to the first user account, an indication that a user corresponding to the user identifier initiated the request to perform the network transaction.

7. The computer-implemented method of claim 1, wherein the at least one intermediary holding account, the first user account, and the second user account correspond to a transactional source computer network that communicates with both the first network transaction platform and the second network transaction platform.

8. The computer-implemented method of claim 1, further comprising:
receiving a request to modify a user attribute for the first user account corresponding to the first network transaction platform; and
transmitting instructions to the second network transaction platform to cause the second network transaction platform to modify the user attribute for the second user account upon determining that the first user account is associated with the second user account.

9. The computer-implemented method of claim 8, wherein the user attribute comprises a user phone number, a user email, a user address, or a user account setting.

10. The computer-implemented method of claim 8, further comprising:
requesting user attributes corresponding to the first user account and the second user account from a third-party authentication network to cause the third-party authentication network to access user attributes from the first network transaction platform and the second network transaction platform.

11. A non-transitory computer-readable medium storing instructions that, when executed by at least one processor, cause a computing device to:
deploy, in an electronic computing network, a server computing device comprising a cross-platform transaction coordination system communicating with a plurality of network transaction platforms, wherein each network transaction platform comprises a plurality of financial source computing devices for holding financial resources in accounts associated with users of the cross-platform transaction coordination system, wherein the cross-platform transaction coordination system is configured for electronic communication with a plurality of user computing devices associated with the users of the cross-platform transaction coordination system and with the plurality of financial source computing devices;
transmit, by the cross-platform transaction coordination system, to the plurality of user computing devices, an application for execution on the plurality of user computing devices, wherein the application is configured to generate an interface on display of the plurality of user computing devices for digital interactions of user financial transactions;
establish and manage, by the cross-platform transaction coordination system, a plurality of intermediary holding accounts with various combinations of the network transaction platforms, wherein the intermediary holding accounts are configured to enable network transactions between users on the network transaction platforms;
register, by the cross-platform transaction coordination system, a first user account corresponding to a first network transaction platform wherein the first network transaction platform is configured for electronic communications with other computer devices according to a first collection of data schemas, wherein each data schema comprises source code and/or network communication protocols for exchanging financial instructions, messages, or objects with other computing devices;
registering, by the cross-platform transaction coordination system, a second user account corresponding to a second network transaction platform wherein the second network transaction platform is configured for electronic communication with other computer devices according to a second collection of data schemas differing from the first collection of data schemas and wherein the first user account is different from the second user account;
receive, by the cross-platform transaction coordination system, from a first user computing device associated with the first user account via an input on the interface of the first user computing device, a request to perform a network transaction between the first user account corresponding to the first network transaction platform and the second user account corresponding to the second network transaction platform; and
based on an inability to communicate network transactions via a specific or dedicated one-to-one communication protocol between the first network transaction platform and the second network transaction platform:
transmit, by the cross-platform transaction coordination system, a first set of instructions to the first network transaction platform to cause the first network transaction platform to initiate transfer of a transactional value for the network transaction from an account of the first network transaction platform to at least one intermediary holding account without communicating the first set of instructions to the second network transaction platform, wherein the intermediary holding account is associated with the second network transaction platform, wherein the first set of instructions comprise a schematized data message according to a data schema of the first collection of data schemas, and wherein the transactional value and transaction attributes are objects of the schematized data message;
transmit, by the cross-platform transaction coordination system, a second set of instructions to the second network transaction platform to cause the second network transaction platform to receive the transactional value from the at least one intermediary holding account for the network transaction at an account of the second network transaction platform without communicating the second set of instructions to the first network transaction platform, wherein the second set of instructions comprise a schematized data message according to a data schema of the second collection of data schemas and wherein the transactional value and the transaction attributes are objects of the schematized data message; and receive, by the cross-platform transaction coordination system, from a financial source computing device of the plurality of financial source computing devices hosting the intermediary holding account, a data indicator indicating a transfer of the transactional value between the first user account corresponding to the first network transaction platform and the second user account corresponding to the second network transaction platform utilizing the at least one intermediary holding account.

12. The non-transitory computer-readable medium of claim 11, further comprising instructions that, when executed by the at least one processor, cause the computing device to:

transmit instructions to the first network transaction platform to cause the first network transaction platform to modify a first user account value corresponding to the first user account based on the transactional value of the network transaction; and transmit instructions to the second network transaction platform to cause the second network transaction platform to modify a second user account value corresponding to the second user account based on the transactional value of the network transaction.

13. The non-transitory computer-readable medium of claim 12, further comprising instructions that, when executed by the at least one processor, cause the computing device to provide, for display, within a graphical user interface of a second user computing device associated with the second user account, the second user account value.

14. The non-transitory computer-readable medium of claim 11, further comprising instructions that, when executed by the at least one processor, cause the computing device to initiate an aggregated transfer of multiple transactional values between the account of the first network transaction platform and the account of the second network transaction platform utilizing the at least one intermediary holding account.

15. The non-transitory computer-readable medium of claim 11, wherein the data indicator indicates an account value of the at least one intermediary holding account.

16. A system comprising:
at least one processor; and
at least one non-transitory computer-readable storage medium storing instructions that, when executed by the at least one processor, cause the system to:
deploy, in an electronic computing network, a server computing device comprising a cross-platform transaction coordination system communicating with a plurality of network transaction platforms, wherein each network transaction platform comprises a plurality of financial source computing devices for holding financial resources in accounts associated with users of the cross-platform transaction coordination system, wherein the cross-platform transaction coordination system is configured for electronic communication with a plurality of user computing devices associated with the users of the cross-platform transaction coordination system and with the plurality of financial source computing devices;

transmit, by the cross-platform transaction coordination system, to the plurality of user computing devices, an application for execution on the plurality of user computing devices, wherein the application is configured to generate an interface on display of the plurality of user computing devices for digital interactions of user financial transactions;

establish and manage, by the cross-platform transaction coordination system, a plurality of intermediary holding accounts with various combinations of the network transaction platforms, wherein the intermediary holding accounts are configured to enable network transactions between users on the network transaction platforms;

register, by the cross-platform transaction coordination system, a first user account corresponding to a first network transaction platform wherein the first network transaction platform is configured for electronic communications with other computer devices according to a first collection of data schemas, wherein each data schema comprises source code and/or network communication protocols for exchanging financial instructions, messages, or objects with other computing devices;

registering, by the cross-platform transaction coordination system, a second user account corresponding to a second network transaction platform wherein the second network transaction platform is configured for electronic communication with other computer devices according to a second collection of data schemas differing from the first collection of data schemas and wherein the first user account is different from the second user account;

receive, by the cross-platform transaction coordination system, from a first user computing device associated with the first user account via an input on the interface of the first user computing device, a request to perform a network transaction between the first user account corresponding to the first network transaction platform and the second user account corresponding to the second network transaction platform; and based on an inability to communicate network transactions via a specific or dedicated one-to-one communication protocol between the first network transaction platform and the second network transaction platform:

transmit, by the cross-platform transaction coordination system, a first set of instructions to the first network transaction platform to cause the first network transaction platform to initiate transfer of a transactional value for the network transaction from an account of the first network transaction platform to at least one intermediary holding account without communicating the first set of instructions to the second network transaction platform, wherein the intermediary holding account is associated with the second network transaction platform, wherein the first set of instructions comprise a schematized data message according to a data schema of the first collection of data schemas, and wherein the transactional value and transaction attributes are objects of the schematized data message;

transmit, by the cross-platform transaction coordination system, a second set of instructions to the second network transaction platform to cause the second network transaction platform to receive the transactional value from the at least one intermediary holding account for the network transaction at an account of the second network transaction platform without communicating the second set of instructions to the first network transaction platform, wherein the second set of instructions comprise a schematized data message according to a data schema of the second collection of data schemas and wherein the transactional value and the transaction attributes are objects of the schematized data message; and receive, by the cross-platform transaction coordination system, from a financial source computing device of the plurality of financial source computing devices hosting the intermediary holding account, a data indicator indicating a transfer of the transactional value between the first user account corresponding to the first network transaction platform and the second user account corresponding to the second network transaction platform utilizing the at least one intermediary holding account.

17. The system of claim 16, further comprising instructions that, when executed by the at least one processor, cause the system to:

transmit instructions to the first network transaction platform to cause the first network transaction platform to modify a first user account value corresponding to the first user account based on the transactional value of the network transaction; and transmit instructions to the second network transaction platform to cause the second network transaction platform to modify a second user account value corresponding to the second user account based on the transactional value of the network transaction.

18. The system of claim 16, further comprising instructions that, when executed by the at least one processor, cause the system to:

receive a request to modify a user attribute for the first user account corresponding to the first network transaction platform, wherein the user attribute comprises a user phone number, a user email, a user address, or a user account setting; and transmit instructions to the second network transaction platform to cause the second network transaction platform to modify the user attribute for the second user account upon determining that the first user account is associated with the second user account.

19. The system of claim 16, further comprising instructions that, when executed by the at least one processor, cause the system to:

receive an additional request to perform an additional network transaction between the first user account corresponding to the first network transaction platform and a third user account corresponding to a third network transaction platform; and receive an additional data indicator of an additional transfer of an additional transactional value between the first user account corresponding to the first network transaction platform and the third user account corresponding to the third network transaction platform utilizing an additional intermediary holding account from the at least one intermediary holding account.

20. The system of claim 16, further comprising instructions that, when executed by the at least one processor, cause the system to initiate an aggregated transfer of multiple transactional values between the account of the first network transaction platform and the account of the second network transaction platform utilizing the at least one intermediary holding account.

* * * * *